(12) United States Patent
Lamoureux et al.

(10) Patent No.: US 10,510,024 B2
(45) Date of Patent: Dec. 17, 2019

(54) COORDINATED DISRUPTION HANDLING

(71) Applicant: Amadeus S.A.S., Biot (FR)

(72) Inventors: Yann Lamoureux, Biot (FR); Emilie Glerant, Antibes (FR); Sarah Emilie Marie Muguerza, Antibes (FR); Antoine Lefebvre, Isleworth (GB); Alexandra Beatrix Stephanie Gualmini, Antibes (FR)

(73) Assignee: AMADEUS S.A.S., Biot (FR)

( * ) Notice: Subject to any disclaimer, the term of this patent is extended or adjusted under 35 U.S.C. 154(b) by 323 days.

(21) Appl. No.: 15/453,384

(22) Filed: Mar. 8, 2017

(65) Prior Publication Data
US 2018/0260741 A1 Sep. 13, 2018

(51) Int. Cl.
G06Q 10/02 (2012.01)

(52) U.S. Cl.
CPC .................... G06Q 10/02 (2013.01)

(58) Field of Classification Search
CPC ....................................................... G06Q 10/02
See application file for complete search history.

(56) References Cited

U.S. PATENT DOCUMENTS

| 2003/0225600 | A1* | 12/2003 | Slivka | G06Q 10/02 705/5 |
| 2004/0039614 | A1* | 2/2004 | Maycotte | G06Q 10/02 705/5 |
| 2004/0039617 | A1* | 2/2004 | Maycotte | G06Q 10/02 705/5 |
| 2004/0102979 | A1* | 5/2004 | Robertson | G06Q 10/025 705/6 |

(Continued)

FOREIGN PATENT DOCUMENTS

| EP | 2587221 A2 | 5/2013 |
| EP | 3016039 A1 | 5/2016 |
| WO | 03036417 A2 | 5/2003 |

OTHER PUBLICATIONS

National Industrial Property Institute, Preliminary Search Report issued in French Patent Application No. 1751883 dated Sep. 6, 2017.

(Continued)

Primary Examiner — Fahd A Obeid
Assistant Examiner — Michael Jared Walker
(74) Attorney, Agent, or Firm — Thompson Hine LLP

(57) ABSTRACT

Systems, methods, and computer program products for coordinating operation of relevant systems after a passenger itinerary disruption. Responsive to a transfer request being received that includes at least a portion of a new travel itinerary to replace a disrupted travel itinerary of each of multiple passengers, an inventory system automatically updates counters based on the disrupted travel itinerary of each passenger and the new travel itinerary, and a reservation system automatically updates one or more reservation records to reflect an association between each passenger and the new travel itinerary. Thereafter, a ticketing system automatically performs a ticketing process for each passenger relative to the new travel itinerary, and a departure control system automatically transfers passenger data stored for each passenger in association with the disrupted travel itinerary of the passenger to a record associated with the new travel itinerary.

20 Claims, 5 Drawing Sheets

(56) References Cited

U.S. PATENT DOCUMENTS

| | | | | |
|---|---|---|---|---|
| 2004/0199411 A1* | 10/2004 | Bertram | G06Q 10/02 | 705/5 |
| 2004/0249500 A1* | 12/2004 | Mateer | G06Q 10/02 | 700/225 |
| 2005/0065834 A1* | 3/2005 | Hale | G06Q 10/02 | 700/83 |
| 2005/0123265 A1* | 6/2005 | Kimura | G02F 1/133621 | 385/147 |
| 2005/0125263 A1* | 6/2005 | Bramnick | G06Q 10/02 | 705/5 |
| 2007/0143154 A1* | 6/2007 | Ashby | G06Q 10/02 | 705/5 |
| 2008/0010005 A1* | 1/2008 | Small | G08G 5/00 | 701/120 |
| 2009/0182590 A1* | 7/2009 | Ashby | G06Q 10/02 | 705/5 |
| 2009/0276089 A1* | 11/2009 | Bartholomew | G06Q 10/02 | 700/235 |
| 2010/0140399 A1* | 6/2010 | Chevance | G06Q 10/00 | 244/118.6 |
| 2010/0293386 A1* | 11/2010 | Kezzou | G06Q 10/10 | 713/176 |
| 2011/0022405 A1* | 1/2011 | Heinz | G06Q 10/02 | 705/1.1 |
| 2011/0055770 A1* | 3/2011 | Hed | G06Q 10/02 | 715/854 |
| 2011/0071864 A1* | 3/2011 | Hourdou | G06Q 10/02 | 705/6 |
| 2013/0117057 A1* | 5/2013 | Van Moltke | G06Q 10/06311 | 705/7.13 |
| 2014/0039944 A1* | 2/2014 | Humbert | G06Q 10/02 | 705/5 |
| 2014/0200932 A1* | 7/2014 | Daouk | G06Q 10/02 | 705/5 |
| 2014/0278615 A1* | 9/2014 | Ince | G06Q 10/025 | 705/6 |
| 2014/0289306 A1* | 9/2014 | O'Sullivan | G06Q 50/30 | 709/203 |
| 2015/0161526 A1* | 6/2015 | Yalcin | G06Q 10/02 | 705/5 |
| 2015/0161528 A1* | 6/2015 | Yalcin | G06Q 10/025 | 705/5 |
| 2015/0294235 A1* | 10/2015 | Laffitte | G06Q 10/02 | 705/5 |
| 2015/0294236 A1* | 10/2015 | Laffitte | G06Q 10/02 | 705/5 |
| 2016/0086103 A1* | 3/2016 | Elf | G06Q 10/02 | 705/5 |
| 2016/0092796 A1* | 3/2016 | Tran | G06Q 10/02 | 705/5 |
| 2016/0117618 A1* | 4/2016 | Wang et al. | G06Q 10/025 | 705/6 |
| 2016/0125327 A1* | 5/2016 | Lamoureux | G06Q 10/025 | 705/6 |
| 2016/0217046 A1* | 7/2016 | Lamoureux | G06F 16/2379 | |
| 2016/0232626 A1* | 8/2016 | Geraci | G06Q 50/14 | |

OTHER PUBLICATIONS

European Patent Office, Search Report issued in Application No. 18160553.6 dated Apr. 24, 2018.

* cited by examiner

COORDINATED DISRUPTION HANDLING

TECHNICAL FIELD

The present invention generally relates to handling itinerary disruptions, and more particularly, to systems, methods, and computer programs products for coordinating systems to address such disruptions.

BACKGROUND

The provision of products and services to a customer often involves several systems, each serving a different function. In the case of flight segments, for example, the provision of products and services may involve a system for tracking the number of seats available on each scheduled flight, a system for managing reservations, a system for performing ticketing operations, and a system for managing operations at the airport. On occasion, a passenger's booked travel itinerary may become disrupted, such as due to one of the flights in the travel itinerary being delayed or cancelled. In response to such a disruption, it is desirable for the airline to quickly make alternative arrangements for the passenger. However, finding and making such alternative arrangements implicates many of the airline's systems, such as those listed above. Thus, if not handled correctly, finding and making alternative arrangements for a disrupted passenger may result in inefficiencies and discrepancies between each of the implicated systems, which may lead to other ill effects, such as slow response times and overbooking.

Thus, improved systems, methods, and computer program products are needed to address itinerary disruptions in a fully integrated, coordinated, and efficient manner.

SUMMARY

In one exemplary embodiment, a disruption handling system that coordinates operation of a plurality of systems included in the disruption handling system after a disruption includes an inventory system, a reservation system, a ticketing system, and a departure control system (DCS). The inventory system includes a first database that includes counters, each of the counters tracking an availability figure for a travel product. The reservation system includes a second database that includes one or more reservation records for passengers, each of the passengers being included in one of the one or more reservation records and being associated within the one reservation record to a first travel itinerary on which the passenger is booked. The DCS includes a third database that includes passenger data stored for each passenger that relates to the first travel itinerary of the passenger. The ticketing system includes a fourth database that includes an E-ticket for each passenger. The inventory system, reservation system, ticketing system, and DCS are connected via a computer network.

The disruption handling system also includes processors and memory devices. Each of the inventory system, the reservation system, the ticketing system, and the DCS includes at least one of the processors. The memory devices include instructions that, upon execution by the processors of the disruption handling system, cause the disruption handling system to, in response to receiving, at the disruption handling system and after the first travel itinerary of each passenger has been disrupted, a transfer request including the passengers and at least a portion of a second travel itinerary to replace the first travel itinerary of each passenger, automatically perform the following operations. The inventory system automatically updates the counters of the first database based on the first travel itinerary of each passenger and the second travel itinerary, and the reservation system automatically updates the one or more reservation records of the second database to reflect an association between each passenger and the second travel itinerary. After the first and second databases have been updated, the ticketing system automatically performs an automated ticketing process for each passenger for the second travel itinerary, and the DCS, for each passenger, automatically transfers the passenger data relating to the first travel itinerary to a record included in the third database that is associated with the second travel itinerary.

The instructions upon execution may cause the disruption handling system to update, by the inventory system, the counters of the first database based on the first travel itinerary for each passenger and the second travel itinerary, and update, by the reservation system, the one or more reservation records of the second database to reflect an association between each passenger and the second travel itinerary, by causing the disruption handling system to determine, by the inventory system, whether the passengers can be rebooked onto the second travel itinerary based on the counters of the first database. In response to determining that the passengers can be rebooked onto the second travel itinerary, the following may be performed for each passenger: rebook, by the reservation system, the passenger onto the second travel itinerary in the second database, and in response to the passenger being rebooked, update, by the inventory system, the counters of the first database based on the rebooking.

Furthermore, the instructions upon execution may cause the disruption handling system to update, by the inventory system, the counters of the first database based on the first travel itinerary of each passenger and the second travel itinerary by causing the disruption handling system to transmit a single request to the inventory system, the single request including at least a portion of the first travel itinerary of each passenger and the at least a portion of the second travel itinerary. Thereafter, the inventory system may update the counters of the first database based on the single request.

In addition, the instructions upon execution may further cause the disruption handling system to perform the following. Before the transfer request is received, and in response to a schedule change being executed in the inventory system that affects the first travel itinerary of each passenger, for each passenger, the DCS may automatically generate a backup record for the passenger that includes the passenger data stored for the passenger relating to the first travel itinerary of the passenger. In this situation, the passenger data transferred for the passenger to the record associated with the second travel itinerary may be from the backup record for the passenger. In some instances, the first travel itinerary of each passenger may include a common flight segment, the schedule change may relate to the common flight segment, and the schedule change may be executed within an operational window of the common flight segment. Additionally or alternatively, the transfer request may be generated via the DCS.

Moreover, the passenger data for one of the passengers stored in the third database and relating to the first travel itinerary of the one passenger may include first baggage information for the one passenger, the first baggage information including a first baggage itinerary and a unique identifier. In this case, the instructions upon execution may cause the disruption handling system to transfer the passenger data stored for the one passenger relating to the first travel itinerary of the one passenger to the record included in the third database that is associated with the second travel itinerary by causing the disruption handling system to modify the first baggage information to include a second baggage itinerary that is based on the second travel itinerary. The modified baggage information may be added to the record that is associated with the second travel itinerary, and may include the unique identifier of the first baggage information.

Additionally, the first travel itinerary of each passenger may include a replaced flight, and the second travel itinerary may include a new flight that replaces the replaced flight of the first travel itinerary of each passenger. Correspondingly, the instructions upon execution may further cause the disruption handling system to, in response to the transfer request being received, and before the first and second databases are updated, lock the replaced flight of the first travel itinerary of each passenger and the new flight.

Moreover, the instructions upon execution may cause the disruption handling system to update, by the reservation system, the one or more reservation records of the second database to reflect the association between each passenger and the second travel itinerary by causing the disruption handling system to generate a new reservation record in the second database. The new reservation record may include at least one of the passengers and the second travel itinerary.

Furthermore, the instructions upon execution may cause the disruption handling system to perform, by the ticketing system, the ticketing process for each passenger for the second travel itinerary by causing the disruption handling system to, for each passenger, select an E-ticket transaction selected from the group consisting of an E-ticket revalidation transaction and an E-ticket exchange transaction. A single request may then be transmitted to the ticketing system that includes the E-ticket transaction selected for each passenger. In addition, the instructions upon execution may cause the disruption handling system to perform, by the ticketing system, the ticketing process for each passenger for the second travel itinerary by further causing the disruption handling system to, in response to receiving a rejection of the single request from the ticketing system, generate a separate ticketing request for each passenger. The separate ticketing request generated for each passenger may be transmitted to the ticketing system, and the ticketing system may process each separate ticketing request one at a time.

In addition, the instructions upon execution may cause the disruption handling system to perform, by the ticketing system, the ticketing process for each passenger for the second travel itinerary by further causing the disruption handling system to perform, by the ticketing system, the E-ticket transaction selected for each passenger. In response to the performance of the E-ticket transaction selected for each passenger by the ticketing system, electronic miscellaneous document (EMD) coupons associated with the passengers may be determined, where each of the EMD coupons is for the first travel itinerary of one of the passengers. For each EMD coupon, an EMD transaction for the EMD coupon that is selected from the group consisting of an EMD dis-association transaction, an EMD association transaction, and an EMD exchange transaction may be selected and performed.

In another exemplary embodiment, a method for coordinating operation of systems connected via a communication network that are included in a disruption handling system after a disruption, the systems including the inventory system, the reservation system, the ticketing system, and the DCS described above, includes receiving, at the disruption handling system and after the first travel itinerary of each passenger has been disrupted, a transfer request that includes the passengers and at least a portion of a second travel itinerary to replace the first travel itinerary of each passenger. In response to the transfer request being received at the disruption handling system, the method includes automatically updating, by the inventory system, the counters of the first database based on the first travel itinerary of each passenger and the second travel itinerary, and automatically updating, by the reservation system, the one or more reservation records of the second database to reflect an association between each passenger and the second travel itinerary. After the first and second databases have been updated, the method further includes automatically performing, by the ticketing system, an automated ticketing process for each passenger for the second travel itinerary, and for each passenger, automatically transferring, by the DCS, the passenger data relating to the first travel itinerary to a record included in the third database that is associated with the second travel itinerary.

The method may also include any one or more of the features, and/or performing any one or more of the operations, described above in connection with the exemplary disruption handling system described above.

In a further exemplary embodiment, a computer program product for coordinating operation of systems connected via a communication network that are included in a disruption handling system after a disruption, the systems including the inventory system, the reservation system, the ticketing system, and the DCS described above in connection with the exemplary disruption handling system, includes a non-transitory computer readable storage medium. Instructions are stored on the non-transitory computer readable storage medium that, upon execution by one or more processors of the disruption handling system, cause the disruption handling system to, in response to receiving, at the disruption handling system and after the first travel itinerary of each passenger has been disrupted, a transfer request including the passengers and at least a portion of a second travel itinerary to replace the first travel itinerary of each passenger, automatically perform the following operations. The inventory system automatically updates the counters of the first database based on the first travel itinerary of each passenger and the second travel itinerary, and the reservation system automatically updates the one or more reservation records of the second database to reflect an association between each passenger and the second travel itinerary. After the first and second databases have been updated, the ticketing system automatically performs an automated ticketing process for each passenger for the second travel itinerary, and the DCS, for each passenger, automatically transfers the passenger data relating to the first travel itinerary to a record included in the third database that is associated with the second travel itinerary.

The instructions of the non-transitory computer readable storage medium upon execution may also cause the disruption handling system to implement any one or more of the features, and/or perform any one or more of the operations, described above in connection with the exemplary disruption handling system described above.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

Embodiments of the present invention will be understood and appreciated more fully from the following detailed description taken in conjunction with the drawings.

DETAILED DESCRIPTION

Many of the embodiments described herein relate to coordinating a network of systems to handle a passenger itinerary disruption. In particular, when a passenger booked on a travel itinerary becomes disrupted, such as due to a flight cancellation or delay, it may become necessary to transfer the passenger to a new travel itinerary, and do so quickly. Such a transfer, however, may implicate several computer systems that each serves a respective role in the provision of travel products and services to passengers. The advent of computer systems and the Internet to provide travel products and services to passengers has increased the complex and sensitive nature of transferring a passenger to a new travel itinerary, as each of these systems may host data that is relevant to the transfer and that can be affected by any number of conflicting processes originating from any number of other computer systems. Thus, described herein are embodiments for coordinating the operation of the implicated computer systems to affect a passenger transfer in a manner that maintains the integrity of the computer systems within their respective roles. Moreover, one or more of these embodiments coordinate the implicated computer systems in a manner that improves total response time in conjunction with maintaining system integrity.

Figure 1:
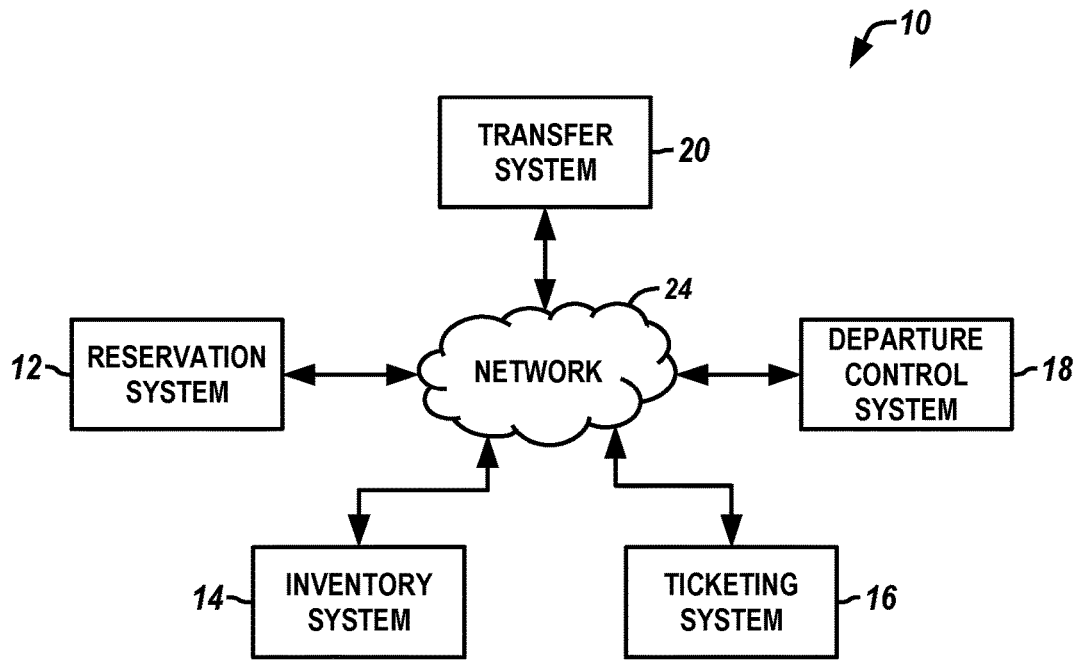
FIG. 1 is a schematic view of an exemplary operating environment that includes a plurality of computer systems for handling itinerary disruptions.

FIG. 1 illustrates an operating environment 10 that may include one or more of a reservation system 12, an inventory system 14, a ticketing system 16, a departure control system (DCS) 18, and a transfer system 20. Each of these systems may communicate via a network 24, such as the Internet. Furthermore, two or more of these systems may be integrated with one another. For example, the transfer system 20 may be hosted by the inventory system 14, and/or by one or more of the other systems of operating environment 10.

The reservation system 12 may be configured to process search and booking requests for travel products and services offered by one or more service providers, such as one or more airlines. For example, the reservation system 12 may receive a search or booking request from a travel agent or customer via a computer device, such as a desktop, laptop, mobile device, tablet, etc., for one or more travel products. In response to receiving a search request for one or more travel products, the reservation system 12 may query a database hosted by the inventory system 14 for available travel products that match one or more search criteria of the search request. Upon or after receiving the available travel products from the database, the reservation system 12 may transmit one or more of the available travel products to the requesting computer device for review.

In response to receiving a booking request that includes payment information and a selection of one or more travel products, the reservation system 12 may create a booking for the one or more travel products at least in part by generating and storing a reservation record. Each reservation record generated and stored by the reservation system 12 may include an identification of one or more customers and one or more travel products booked by the one or more customers. In some embodiments, the reservation system 12 may be associated with a particular airline, and each reservation record stored therein may be a passenger name record (PNR) that includes an identification of one or more passengers and a travel itinerary booked by the one or more passengers, such that the one or more passengers and the travel itinerary of the one or more passengers are associated with one another within the reservation record. The travel itinerary may include one or more of the airline's flights and/or the airline's partner flights (i.e., flights operated by another airline having an agreement with the airline associated with the reservation system 12).

In alternative embodiments, the reservation system 12 may be a global distribution system (GDS) that facilitates searching and booking flight travel products and/or non-flight travel products from several different service providers, notwithstanding whether the different service providers have partnership agreements. In this case, each reservation record generated and stored by the reservation system 12 may be a total travel record (TTR) that is capable of including both flight travel products and non-flight travel products from multiple service providers. Non-limiting examples of non-flight travel products include hotel rooms, rental cars, event and attraction admissions, and any other non-flight travel products often associated with travel.

A reservation record generated and stored by the reservation system 12 may also include customer preferences and/or ancillary services booked by customers in connection with the travel products identified in the reservation record. In particular, each customer's preferences and booked ancillary services may be represented by a special service request (SSR) element included in the reservation record. For example, in the case of a reservation record that includes a seat on a flight, the reservation record may also include a customer's seating preference and meal preference in relation to the flight. As another example, the reservation record may include an indication of a special accommodation requested by a customer, such as an indication that the customer requires assistance, or an indication that the customer will be accompanied by an infant or a service animal. Some of the booked ancillary services included in the reservation record may be chargeable ancillary services purchased by a customer. Non-limiting examples of chargeable ancillary services include seat upgrades, baggage handling, meal requests, etc.

The inventory system 14 may be configured to track an availability figure for each travel product and ancillary service offered by the one or more service providers. Specifically, the inventory system 14 may include a database that stores a total number of bookable units offered by the service providers for each travel product (e.g., the total number of seats offered by an airline for each booking class on each scheduled flight), and counters that track an availability figure for each offered travel product by counting the number of units that have been booked for each offered travel product. Similarly, the inventory system 14 may include a database that stores a total number of bookable units for each ancillary service offered in connection with each offered travel product, and counters that track an availability figure for each ancillary service offered in connection with each offered travel product by counting the number of units that have been purchased and/or booked for each ancillary service offered in connection with each offered travel product.

Thus, in response to receiving a search request for travel products from a travel agent or customer, the reservation system 12 may query the inventory system 14 for available travel products matching one or more search criteria of the search request. Moreover, in response to receiving a booking request for travel products, the reservation system 12 may query the inventory system 14 to determine whether the travel products are available, and if so, also notify the inventory system 14 when the booking is complete so that the inventory system 14 can adjust the counters associated with the booked travel products. In a similar fashion, in response to receiving a search or a booking request for an ancillary service from a travel agent or customer in connection with a given flight, the reservation system 12 may query the inventory system 14 to determine whether the ancillary service is available, and if so, notify the inventory system 14 of the purchase or booking of the ancillary service so that the inventory system 14 can adjust the appropriate counters.

In some embodiments, multiple travel products tracked by the inventory system 14 may relate to a same event. For example, in the case of a flight, an airline may offer multiple travel products for the flight, each of which is associated with a different booking class that has a different price. In general, the availability and/or price associated with each travel product offered by a service provider may depend on the level of service associated with the travel product (e.g., first class, economy) and/or revenue criteria associated with the travel product (e.g., how many units of the travel product have been or are expected to be booked prior to the scheduled utilization of the travel product, how many units of other travel products relating to the same event have been or are expected to be booked prior to the scheduled utilization of the travel product, and how far in advance the booking is made).

The ticketing system 16 may be configured to generate and store E-tickets, as well as other electronic documents associated with booked travel products and ancillary services. More particularly, when travel products are booked, the reservation system 12 may automatically notify the ticketing system 16 of the booking. In response, the ticketing system 16 may generate an E-ticket for each customer included in the booking. Each E-ticket that is generated by the ticketing system 16 may include one or more coupons for one or more booked travel products, such as one or more booked flight segments, that are part of a same travel itinerary. In particular, each E-ticket may include an identification of a customer, one or more coupons for one or more booked travel products that relate to a same booked travel itinerary, and/or fares and taxes paid for the one or more booked travel products. In general, an E-ticket may symbolize proof of payment and entitlement to the booked travel products indicated therein by the customer. Thus, when a customer thereafter proceeds to utilize the booked travel products, the E-ticket may be referenced as proof that the customer is entitled to the travel products. Each E-ticket may also include a unique identifier, such as a reference number, that is specific to the E-ticket. The unique identifier of a given E-ticket may be stored in the reservation record for the booking for which the E-ticket is generated such that the unique identifier is associated with the booked travel products associate with the E-ticket within the reservation record.

As previously described, some ancillary services may be chargeable and therefore associated with a fee. In response to a chargeable ancillary service being booked and the associated fee being paid, the ticketing system 16 may generate an electronic miscellaneous document (EMD) coupon for the purchased ancillary service. Similar to an E-ticket, an EMD coupon may include an indication of a customer, the purchased ancillary service, and/or the taxes and fees paid for the ancillary service. Like an E-ticket, an EMD coupon may provide proof of payment and entitlement to the purchased ancillary service. Upon creation of an EMD coupon in connection with a booked travel product, the EMD coupon and the E-ticket generated for the booked travel product may be associated with one another by the ticketing system 16. More particularly, each of the E-ticket and the EMD coupon may be modified to include a reference to the other, such as the other's unique identifier. Thus, like the E-ticket, the EMD coupon may include a unique identifier that is specific thereto, which may also be included in the reservation record created for the booked travel product associated with the EMD coupon and/or may be included in the reservation record associated with the service for which the EMD coupon is generated.

The departure control system (DCS) 18 may be configured to perform operations on behalf of service providers, such as those service providers utilizing the reservation system 12 and the inventory system 14, at a travel terminal, such as an airport. More particularly, the DCS 18 may facilitate the provision of travel products to passengers on the day of travel. Non-limiting examples of operations performed by the DCS 18 may include checking in and boarding passengers onto a flight, managing baggage information, and printing boarding passes. A single DCS 18 at a travel terminal may serve multiple service providers to perform each respective service provider's airport operations. However, each access point for the DCS 18 in a travel terminal (e.g., each computer terminal in an airport having connectivity to the DCS 18), may be configured to serve and/or be dedicated to one airline at a time. For example, one group of computer terminals in an airport may be configured to serve and/or be dedicated to airline A, and another group of computer terminals in the airport may be configured to serve and/or be dedicated to airline B.

The DCS 18 may begin performing airport operations for a given flight when an "operational window" opens for the flight, which may be one or more days (e.g., 3 days) before the flight's scheduled departure. At this time, the DCS 18 may open the flight for DCS operations, such as by creating a record for the flight, and receive a passenger name list (PNL) for the flight from the reservation system 12. The PNL may include information from the reservation records that include the given flight. Non-limiting examples of information that may be included in the PNL include identification data for each passenger booked on the flight (e.g., name, age, nationality, country, birthplace, birthdate, and sex), the full travel itinerary of each passenger, preferences selected by each passenger, ancillary services booked by each passenger, and the unique identifiers associated with the E-tickets and EMD coupons of each passenger relative to the flight. After opening the flight, for each passenger in the PNL, the DCS 18 may store data for the passenger, such as in a DCS record associated with the flight and/or specific to the passenger, that includes the passenger's information included in the PNL. In this way, for passengers booked on a travel itinerary including one or more open flights, the DCS 18 may store passenger data for each passenger that relates to the travel itinerary of the passenger. In particular, for each passenger, the DCS 18 may store passenger data in one or more DCS records, each of the one or more DCS records being associated with one of the open flights of the travel itinerary booked for the passenger. Each flight open in the DCS 18 may be associated with one or more DCS records, each including passenger data for one or more of the passengers booked on the flight.

Within the flight's operational window, and/or within a set time period prior to the flight's scheduled departure time, such as the 24 hours before, the DCS 18 may enable checking in (aka "accepting") passengers onto the flight. When a passenger is accepted onto the flight, the DCS 18 may modify the passenger's DCS record for the flight to indicate the passenger's checked-in status, which may be considered part of the passenger data for the passenger of the DCS record. This modification may lock the passenger's E-ticket and/or EMD coupons relative to the flight, thereby preventing them from being changed and/or utilized in connection with an alternative travel product rather than the flight. The DCS 18 may also modify the passenger's DCS record for the flight to include additional passenger data for the flight for the passenger, such as an acceptance time, an assigned seat for the passenger, and/or regulatory data (e.g., data relating to government imposed checks). Further during this period, a passenger may elect to check his or her baggage, in which case the DCS 18 may generate electronic baggage information for the passenger. The electronic baggage information may include a baggage itinerary, a unique identifier physically associated with the baggage, such as via a tag placed on the baggage, and a baggage fee waiver if applicable. The DCS 18 may then insert the passenger's baggage information into the passenger's DCS record for the flight as part of the passenger data for the passenger stored therein.

The DCS 18 may host (i.e., perform airport operations for) various types of flights. For example, the DCS 18 may host internal flights, or in other words, those flights managed by the reservation system 12 and inventory system 14 of operating environment 10. The DCS 18 may also host ground-handled flights. Ground-handled flights are flights managed by reservation and inventory systems external to the operating environment 10, but delegated to the DCS 18 for operations at a particular airport. For example, an airline utilizing a reservation and inventory system external to the operating environment 10 may also normally utilize another DCS that differs from the DCS 18 for its airport operations. At some airports in which the airline has flights, however, the other DCS may not be available. Thus, if the DCS 18 is available at one of these airports, then the airline may delegate operations for that airport to the DCS 18. Other flights that are not hosted by the DCS 18 may be referred to herein as "external flights".

In general, when a passenger proceeds to be checked into a given flight via the DCS 18, the DCS 18 may also check the passenger onto other open flights in the passenger's travel itinerary. In particular, the DCS 18 may utilize the passenger's travel itinerary, which may be included in or associated with the passenger's DCS record for the given flight, to check the passenger into one or more of the open flights of the itinerary. In some situations, the passenger's travel itinerary may include flights booked via multiple airlines and/or flights external to the DCS 18. When checking in the passenger, the DCS 18, which may be operating on behalf of a particular airline, may also cause the passenger to be checked into the flights associated with the other airlines and/or the flights external to the DCS 18, assuming the flights are likewise open for check-in and/or the proper arrangements are in place. In the case of an external flight included in a passenger's travel itinerary, for example, the DCS 18 may be configured to send a message to the airline associated with the external flight, which may then check the passenger onto the external fight utilizing its DCS. The process of checking in passengers onto a flight associated with an airline that differs from the airline triggering the check-in via the DCS 18 may be referred to herein as "through check-in".

Occasionally, either before or after a passenger is checked into a flight, the passenger's travel itinerary may become disrupted. For example, due to unforeseen circumstances such as mechanical problems or inclement weather, one of the flights in the passenger's travel itinerary may be cancelled or unacceptably delayed (e.g., the delay will cause the passenger to miss a connecting flight or arrive at the passenger's final destination outside of an acceptable timeframe). When one of the flights of the passenger's travel itinerary is cancelled or unacceptably delayed, the passenger often needs to be transferred to another travel itinerary that enables the passenger to reach his or her intended destination within his or her desired timeframe, or as close to the desired timeframe as possible.

Transferring passengers from a disrupted travel itinerary to a new travel itinerary implicates certain technical challenges. For example, the systems involved in this process should be able to perform such transfers quickly. Specifically, disruptions to a scheduled flight often do not occur until the flight's scheduled departure date, and the more time that passes after the disruption, the less likely it is that the passenger will be able to arrive at his or her intended destination within the desired timeframe (e.g., seats on alternative flights may get booked, alternative flights may depart). As a corollary, it is also desirable for the involved systems to offer many alternative flights for the new travel itinerary, including those that are not yet open on the DCS 18. Moreover, after a passenger is transferred from a disrupted travel itinerary to a new travel itinerary, it is desirable for all the systems of operating environment 10 to be in a synchronized state so that each system accurately reflects the current bookings and available inventory for each flight.

Conventional systems and methods for transferring passengers from a disrupted travel itinerary to a new travel itinerary do little to address these challenges, and are therefore less than satisfactory. For example, when a travel itinerary is disrupted within its operational window, the passengers affected by the disruption may already be present at the airport and checked into one or more flights. Consequently, transferring the passengers to a new travel itinerary may be handled by a DCS agent interacting with a DCS. In conventional environments, however, DCS's operate rather independently from the reservation systems and inventory systems that they support relative to passenger transfers. More particularly, when a conventional DCS performs a transfer operation that implicates a given flight, the reservation system and inventory system managing the flight are not made aware of the operation until sometime after the flight's departure, such as during a later accounting reconciliation period. Consequently, when a passenger is transferred from one flight to another by a conventional DCS, the implicated reservation systems and inventory systems are not made aware of the transfer in real time, and typically knowledge of the transfer is not known by these systems until after the flights have departed. As a result, prior to the departure of the flights, the implicated reservation systems and inventory systems may fail to accurately reflect the bookings and availability for each flight. Such inaccuracies may lead to the flights being unexpectedly oversold or undersold, and may generate additional workload for the airline for a later accounting reconciliation.

As a related setback, a conventional DCS generally enables a DCS agent to transfer passengers to flights that are already open on the DCS, but not to other flights, such as those that are not yet open or external flights that are not hosted by the particular DCS. Consequently, the number of alternative options for a passenger being transferred is reduced, thereby decreasing the chance that the passenger will be able to reach his or her intended destination within the desired time frame.

Moreover, transferring a passenger via a conventional DCS may be a complex procedure that is prone to errors, especially after the passenger has already checked into the flight from which the passenger is being transferred. As described above, when a passenger checks into a flight, certain information, such as regulatory and baggage information, may be added to the passenger's DCS record for the flight as part of the passenger data stored for the passenger for the flight. Accordingly, when transferring a passenger via the conventional DCS from a checked-in flight to a new flight, the DCS agent typically needs to manually re-accept the passenger onto the new flight at least in part by manually re-entering the passenger's previous check-in information into the DCS. This manual re-acceptance procedure delays the time in which it takes to perform a transfer, and may result in backtracking (resulting in further delay) if erroneous data is re-entered. Moreover, the DCS agent typically has to perform this manual check-in for each passenger being transferred. Thus, if an entire plane of passengers is disrupted and each passenger needs to be transferred, such as when a flight is cancelled, the processing time for transferring all of the disrupted passengers to a new travel itinerary may be burdensomely significant.

In some situations, the travel itinerary of one or more passengers may become disrupted due to a scheduling change (e.g., a cancellation or time change) executed by an airline via an inventory system. However, due to the configuration of conventional systems implicated by a passenger transfer, an airline is typically unable to execute schedule changes to a flight within the flight's operational window and/or after one or more passengers have checked into the flight. Specifically, in response to an airline implementing a schedule change to a flight, such as in a conventional inventory system, a corresponding conventional reservation system is configured to unbook the passengers on the changed flight, which in turn triggers the reservation system to notify a conventional DCS about the unbooking, such as via an adjusted name list (ADL) that supplements the PNL received for the flight with new passenger additions for the flight or deletions of previous passengers for the flight. Upon receiving this notification, the DCS is typically configured to clean itself of the passenger data and/or DCS records for the flight that are associated with the unbooked passengers, which results in the loss of the information included in such records. Consequently, if a passenger has already checked into the changed flight, the information added to the passenger's DCS record for the flight upon check-in, such as baggage information and regulatory information, is lost. Because this information generally needs to be maintained for both business and regulatory reasons, airlines are unable to implement schedule changes via a conventional inventory system within a flight's operational window and/or after one or more passengers have checked into the flight when operating within the conventional travel environment.

The transfer system 20 alleviates these and other issues. Specifically, the transfer system 20 may receive a passenger transfer request via the reservation system 12, the inventory system 14, or the DCS 18. For example, a DCS agent may access the transfer system 20 via a computer terminal of the DCS 18, select one or more replacement flights for a new travel itinerary via a graphical user interface (GUI) generated by the transfer system 20, and thereafter submit a transfer request to the transfer system 20 that includes at least a portion of the new travel itinerary, such as at least the replacement flights. Alternatively, when an airline inventory agent, either within or prior to a flight's operational window, executes a schedule change for a flight via the inventory system 14, the inventory system 14 may display the GUI of the transfer system 20. Utilizing the GUI, the airline agent may select one or more replacement flights for a new travel itinerary, and thereafter submit a transfer request to the transfer system 20 that includes at least a portion of the new travel itinerary, such as at least the replacements flights. As a further example, after a schedule change is executed in the inventory system 14, the transfer system 20 may automatically generate one or more transfer requests for the affected passengers, with each transfer request including at least a portion of a new itinerary automatically selected by the transfer system 20. In other words, the transfer system 20 may "receive" the transfer request via the inventory system 14 by virtue of automatically generating a transfer request in response to a scheduling change being executed in the inventory system 14.

In any event, in response to receiving a transfer request, the transfer system 20 may be configured to automate a specific sequence of complex interactions between the systems of operating environment 10 that fully transfers one or more passengers from a disrupted travel itinerary to another travel itinerary with little or no agent interaction. In other words, after the transfer system 20 has finished processing the transfer request, the transferred passengers may be able to proceed on their new itinerary without any further action by the agent. For example, assuming no errors occur, the agent may not have to manually re-accept each transferred passenger onto the new travel itinerary, or manually copy over check-in information from the passenger's previous DCS records. Moreover, after the transfer system 20 has finished processing the transfer request, the other systems of operating environment 10 may be in a synchronized state so as to ensure that the systems accurately reflect the bookings and availability for each flight affected by the transfer.

In addition, because fast response time is desired and sometimes necessary when transferring passengers from a disrupted travel itinerary to a new travel itinerary, the transfer system 20 may be configured to facilitate the sequence of interactions in a manner that reduces or minimizes the time for completing processing of a received transfer request. In particular, the transfer system 20 may be configured to continue processing the transfer request notwithstanding the occurrence of certain errors. Thereafter, if errors have occurred during the process, a single comprehensive report of all errors may be displayed to the agent, who may then take remedial action. Moreover, for situations involving multiple passengers that need to be transferred, such as because of a schedule change executed in the inventory system 14 that affects an entire flight, the transfer system 20 may be configured to facilitate, for one or more parts of the transfer process, the processing of each passenger in parallel, which further reduces system response time. These and other features of the transfer system 20 are described in more detail below.

Figure 2:
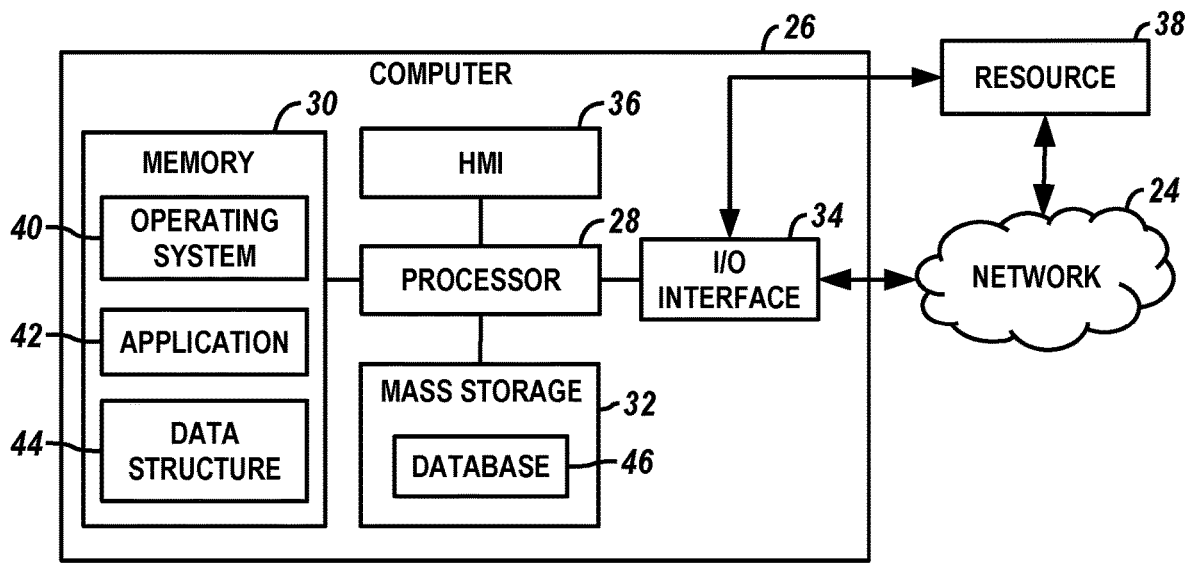
FIG. 2 is a schematic view of an exemplary computer system in FIG. 1.

Referring now to FIG. 2, the systems of operating 10 may be implemented on one or more computer devices, such as exemplary computer device 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. The memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

The processor 28 may operate under the control of an operating system 40 that resides in the memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or the one or more external resources 38. The application 42 may thereby work cooperatively with the network 24 or the external resources 38 by communicating via the I/O interface 34 to provide the various features, functions, applications, processes, or modules comprising embodiments of the invention. The application 42 may also have program code that is executed by the one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules.

Figure 3:
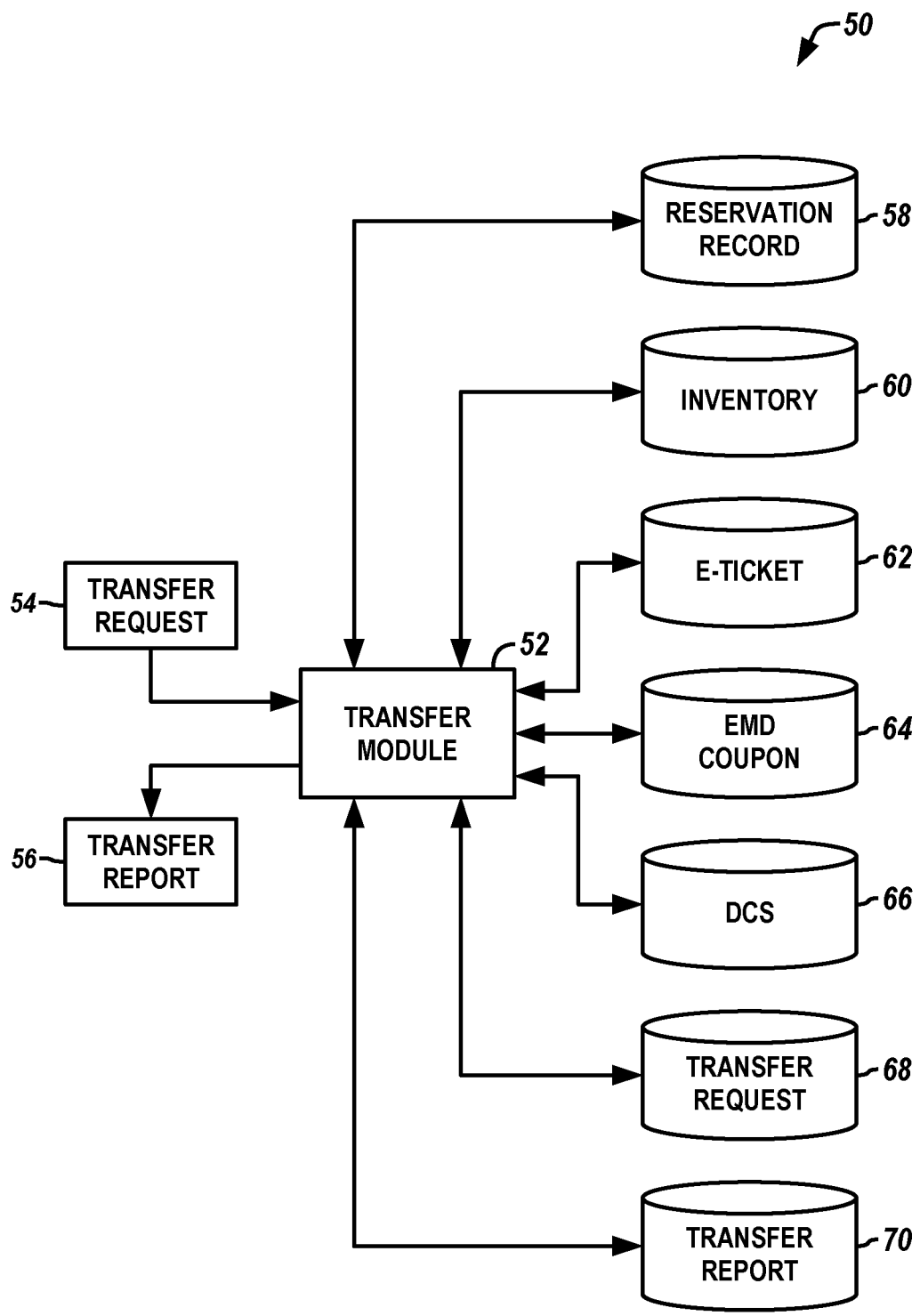
FIG. 3 is a schematic view of an exemplary processing architecture that may be implemented by the computer systems of FIG. 1.

FIG. 3 illustrates a processing architecture 50 that may include a transfer module 52 and a plurality of databases. The transfer module 52 may be hosted by one or more of the systems of operating environment 10, such as the inventory system 14 and/or the transfer system 20. In other words, the transfer module 52 may be implemented via executable computer instructions stored on one or more of the systems of operating environment 10 such that each of the one or more systems comprises a portion of the transfer module 52.

In response to receiving a transfer request 54, the transfer module 52 may be configured to automatically facilitate a sequence of interactions with the databases to completely transfer one or more passengers from a disrupted travel itinerary to a new travel itinerary. More particularly, the transfer module 52 may cause one or more processors, which may be included in one or more of the systems of operating environment 10, to interact with the databases of processing architecture 50 and perform various operations for transferring a passenger from a disrupted travel itinerary to a new travel itinerary in a fully integrated and automated manner. During this process, the transfer module 52 may monitor the status of the passenger transfer process and continuously update a displayed transfer report 56 based thereon. After the transfer process facilitated by the transfer module 52 is completed, the transfer module 52 may store the final version of the transfer report 56, such as in a transfer report database 70. These and other details of the transfer process facilitated by the transfer module 52 are described in more detail in reference to the FIGS. 4-6.

The databases of the processing architecture 50 may include a reservation record database 58, an inventory database 60, an E-ticket database 62, an EMD coupon database 64, a DCS database 66, a transfer request database 68, and the transfer report database 70. Each of the aforementioned databases may be hosted by one or more of the systems of operating environment 10. Each of these databases may comprise multiple databases, and may be part of a larger database that includes one or more of the other databases.

The reservation record database 58 may be hosted by the reservation system 12 of operating environment 10. The reservation record database 58 may store a reservation record, such as a PNR, for each booking made through the reservation system 12. More particularly, the reservation record database 58 may store the reservation records generated by the reservation system 12 as described above in connection with FIG. 1.

The inventory database 60 may be hosted by the inventory system 14 of operating environment 10. The inventory database 60 may track an availability figure for each travel product and/or ancillary service offered by one or more services providers. More particularly, the inventory database 60 may store the total number of bookable units offered by the service providers for each travel product and ancillary service, and the counters for each travel product and ancillary service that track the number of units of each travel product and ancillary service that have been booked, as described above in connection with FIG. 1.

The E-ticket database 62 and the EMD coupon database 64 may be hosted by the ticketing system 16 of operating environment 10. The E-ticket database 62 may store each E-ticket generated by the ticketing system 16, and the EMD coupon database 64 may store each EMD coupon generated by the ticketing system 16. As previously described, in some embodiments, the E-ticket database 62 and the EMD coupon database 64 may be included in a single ticketing database. In this way, each EMD coupon stored in the ticketing database may be associated or linked within the ticketing database to the E-ticket related to the EMD coupon.

The DCS database 66 may be hosted by the DCS 18 of operating environment 10. The DCS database 66 may store a flight record for each open flight in the DCS 18. In addition, the DCS database 66 may store the DCS records generated by the DCS 18 that include the passenger data for the passengers of the opened flights. Each DCS record stored in the DCS database 66 for a given passenger may be associated or linked within the DCS database 66 to one of the open flights of the travel itinerary of the passenger, such as via association with the open flight's record included in the DCS database 66. For example, if a travel itinerary for a passenger includes Flight A and Flight B, then one DCS record for the passenger may be associated or linked within the DCS database 66 to Flight A, and another DCS record for the passenger may be associated or linked within the DCS database 66 to Flight B. Moreover, each of these DCS records may be associated or linked within the DCS database 66 to one another, and/or to the full travel itinerary of the passenger.

The transfer request database 68 and the transfer report database 70 may be hosted by the transfer system 20. The transfer request database 68 may store each transfer request 54 received at the transfer module 52, and the transfer report database 70 may store each final transfer report 56 generated by the transfer module 52. Each transfer report 56 stored in in the transfer report database 70 may include a consolidated summary of the processing of a transfer request 54, including if each passenger of the transfer request 54 was successfully transferred and what actions, if any, need be made or initiated by an agent to complete the transfer request 54. As previously mentioned, the transfer request database 68 and transfer report database 70 may be part of a single transfer database, and each transfer request 54 included in the transfer database may be associated or linked within the transfer database to the corresponding transfer report 56.

Figure 4:
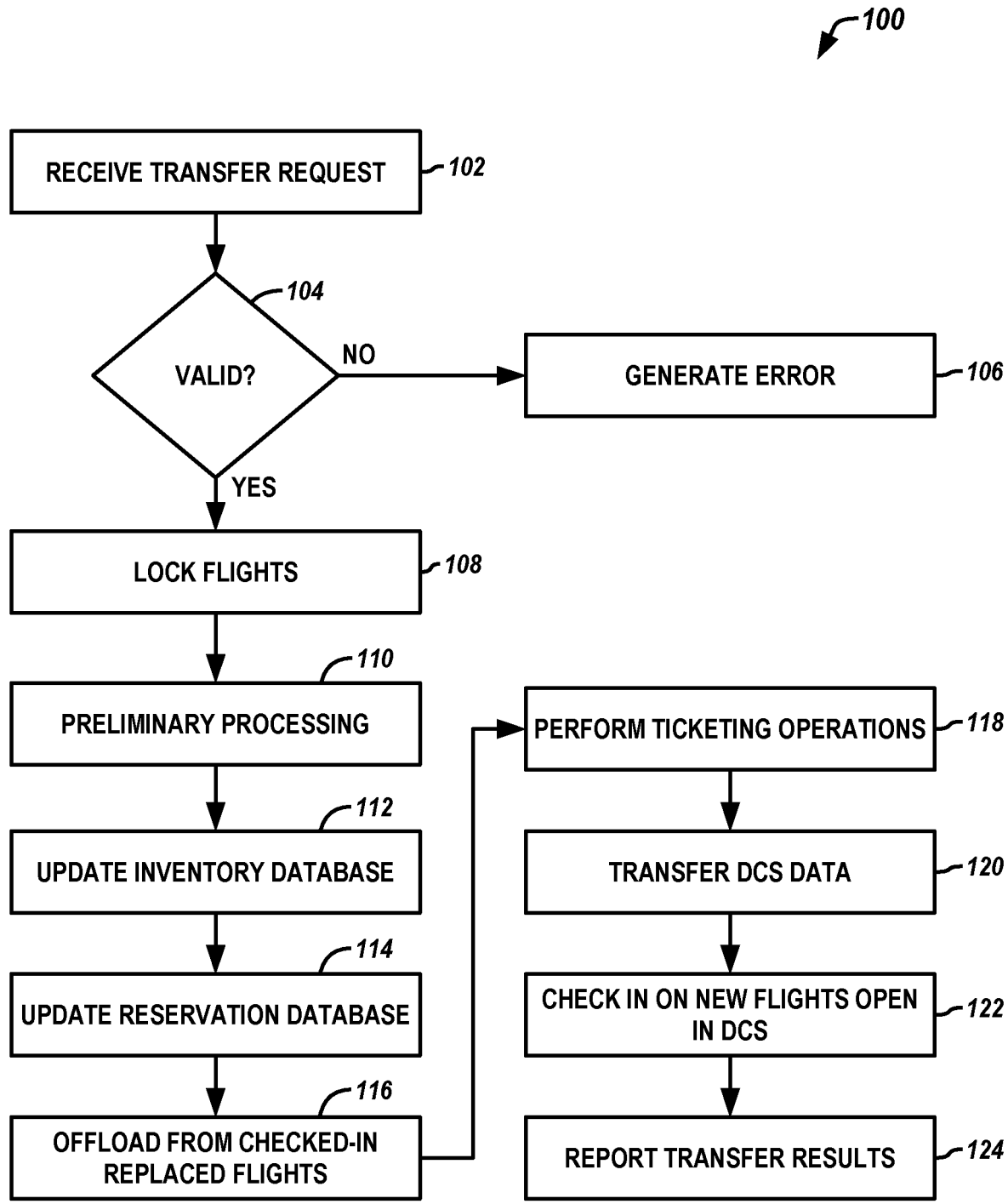
FIG. 4 is a flowchart of an exemplary process for handling itinerary disruptions that may be facilitated by the processing architecture of FIG. 3.

FIG. 4 illustrates a process 100 for transferring passengers from a disrupted travel itinerary to a new travel itinerary. The process 100 may be implemented or facilitated by the transfer module 52 of processing architecture 50. In general, the process 100 may proceed as follows. An authorized agent may access a GUI, such as a GUI generated by the transfer module 52, select passengers impacted by a disruption, and view alternative travel products best matching the selected passengers' disrupted travel itinerary. The agent, using the GUI, may then select one or more of the alternative travel products to include in a new travel itinerary for the passengers, and thereafter trigger the fully integrated and automated passenger transfer process 100. In response to the transfer process 100 being triggered, a transfer request 54 based on the agent's selections may be generated by and/or received at the transfer module 52. In response to transfer request 54 being generated and/or received, the transfer module 52 may be configured to call and/or cause the various systems, such as one or more of the systems of operating environment 10, to perform of a series of sub-processes. The order in which these sub-processes are performed may be specific, as performing the sub-processes out of order may result in unnecessary backtracking, which will reduce the speed and efficiency in which the involved systems are able to complete the transfer.

The series of sub-processes, in order, may include a validation process, an inventory update process, a rebooking process, an offloading process, a ticketing process, a DCS update process, and a reporting process. The validation process may include performing checks on the transfer request 54 to ensure that the transfer request 54 is legitimate and correct. The inventory update process may include updating counters stored in the inventory database 60 based on the non-departed flights of the disrupted travel itinerary that are not included in the new travel itinerary (i.e., replaced flights), and the flights of the new travel itinerary that are not included in the disrupted travel itinerary (i.e., new flights). The rebooking process may include rebooking the selected passengers, and transferring their preferences and ancillary services, onto the new flights of the new travel itinerary in the reservation record database 58. The offloading process may include de-accepting passengers identified in the transfer request 54 who have already checked-in on the replaced flights of the disrupted travel itinerary, which releases control of the passengers' E-tickets relative to the coupons contained therein for the replaced flights and the EMD coupons associated with the replaced flights, and thereby allows the ticketing process to be successful. The ticketing process may include generating a valid E-ticket for the new travel itinerary in the E-ticket database 62 for each passenger, and processing each passenger's EMD coupons associated with the replaced flights in the EMD coupon database 64 for the new travel itinerary. The DCS update process may include transferring information, such as check-in details, within the DCS database 66 so that each passenger's information stored in connection with the replaced flights is carried over to the passenger's information stored in connection with the new flights. Furthermore, the DCS update process may include accepting each passenger onto the new flights that are open in the DCS 18 and/or available via through check-in. Throughout the aforementioned sub-processes, the reporting process may generate and provide a complete and exhaustive report to the agent. The complete and exhaustive report may provide visual and up-to-date data regarding the status of the transfer process 100, such as an overall state of the process 100 and/or which parts of the process 100 succeeded or failed for each passenger.

After each of these processes is performed for the selected passengers, the various systems and/or databases involved in the passenger transfer may be in a synchronized state. Specifically, the reservation records for each selected passenger stored in the reservation record database 58 may include the details of the new travel itinerary, including booked ancillary services in relation thereto, the counters in the inventory database 60 may accurately reflect the availability of the travel products and ancillary services implicated in both the disrupted travel itinerary and the new travel itinerary (e.g., counters for the replaced travel products may be decreased and counters for the new travel products may be increased, etc.), and the DCS 18 may include one or more DCS records for the new flights that include the transferred passengers, the new travel itinerary, and/or any pertinent information previously stored for the passengers in connection with the disrupted travel itinerary (e.g., baggage information). In this way, after the transfer process 100 completes, and with little or no agent interaction, the DCS 18 may be able to perform its regular operations for the transferred passengers as if the passengers initially booked and/or checked in onto the flights of the new travel itinerary. In addition, passengers may continue to be booked on both the replaced flights (if not cancelled) and the new flights with a reduced risk of overselling or underselling these travel products due to being unaware of passengers transferred via the DCS 18.

The process 100 will now be described in additional detail. In block 102, a transfer request 54 may be received, such as at the transfer module 52. More particularly, the transfer request 54 may be received at the transfer module 52 via the reservation system 12, the inventory system 14, or the DCS 18. For example, from a computer terminal connected with the DCS 18, a DCS agent may access a customer record screen or a customer list screen, which may be displayed as part of a GUI that is presented to the agent and that is generated by the transfer module 52 and/or the DCS 18. From the customer record screen or the customer list screen, the DCS agent may then select one or more disrupted passengers for transfer.

In general, the DCS 18 and/or transfer module 52 may enable a DCS agent to transfer a passenger to any type of hosted flight, including those flights managed by the reservation system 12 and inventory system 14 of operating environment 10, and ground handled flights managed by reservation systems and inventory systems external to operating environment 10. Certain sub-processes included in the process 100, such as the rebooking process described above, may be affected by whether the passenger is being transferred from a ground-handled flight or other hosted flight. Such variations are described in more detail below.

In response to receiving the agent's selection of one or more passengers to transfer, the GUI may display a flight selection screen that includes a list of alternative flights for the selected passengers. The list of alternative flights may include both flights hosted by the DCS 18, whether open or not yet opened on the DCS 18, and/or flights external to the DCS 18 (e.g., flights hosted on other DCS's). The latter flights may be clearly identified as external flights. In this way, unlike conventional systems, the DCS 18 and/or transfer module 52 may enable the DCS agent to transfer a passenger from a disrupted travel itinerary to a new travel itinerary that includes flights hosted by the DCS 18, flights that are external to the DCS 18, or a combination thereof. In other words, the DCS 18 provides more options for a transfer than is provided by conventional systems. For alternative flights that are hosted by the DCS 18, the flight selection display screen may display gross availability for each alternative flight, some of which may be based on partnership agreements between airlines operating some of the alternative flights and the airline for which the computer terminal connected to the DCS 18 is currently performing operations.

For the alternative flights that are external to the DCS 18, the flight selection screen may display general reservation availability for each flight. If the DCS agent does select one or more external flights for the new travel itinerary, then in response to the agent's selection, the GUI may display a class selection screen. The class selection screen may enable the DCS agent to choose the class on which the passengers, based on availability, should be rebooked on the selected external flights.

After the DCS agent has selected the passengers to transfer and the new flights for the new travel itinerary, the DCS agent may utilize the GUI to submit a transfer request 54 to the transfer module 52. The transfer request 54 may include an identification of each disrupted passenger requested to be transferred, details of at least a portion of the disrupted travel itinerary of each passenger (e.g., at least the replaced flights), and/or details of at least a portion of the new travel itinerary (e.g., at least the new flights) that is to replace the disrupted travel itinerary for each passenger. In response to submitting the transfer request 54 to the transfer module 52, the GUI may display a transfer report 56 that is periodically refreshed based on the current status of the transfer process 100. In particular, the transfer report 56 may include an overall status of the process 100, and a status of the process 100 for each passenger requested in the transfer.

As previously mentioned, a transfer request 54 may also be received at the transfer module 52 via the inventory system 14. In particular, similar to the DCS 18 case described above, an inventory agent may access a GUI generated by the inventory system 14 and/or the transfer module 52, such a via a computer terminal connected with the inventory system 14. Utilizing the GUI, the inventory agent may select one or more passengers to transfer, select one or more alternative flight options for a new travel itinerary for the passengers, and thereafter submit a transfer request 54 that includes one or more of the items discussed above to the transfer module 52.

Unlike with conventional systems, which generally limit the execution of schedule changes in the inventory system 14 for a given flight to before the operational window of the flight, the reservation system 12, the inventory system 14, the DCS 18, and the transfer module 52 may enable an airline to execute a schedule change for a flight in the inventory system 14 at a time within the flight's operational window. In particular, the DCS 18 and/or the transfer module 52 may be configured to maintain one or more backup records, such as in the DCS database 66, that include the passenger data from DCS records stored in the DCS database 66, such as passenger information, check-in details, baggage information, regulatory information, and travel itinerary information. The DCS 18 and/or transfer module 52 may also be configured such that these backup records are not deleted in response to a schedule change. The data stored in the backup records may be referred to herein as "non-operational data".

Thus, even though a schedule change for a given flight executed in the inventory system 14 within the flight's operational window may trigger the removal of important information stored in relation to passengers booked on the flight, such as information stored in the reservation record database 58 and the DCS database 66, the passengers may still be automatically transferred via the process 100. In particular, by utilizing the non-operational data maintained by the DCS 18 and/or transfer module 52, the process 100 may effectively transfer the affected passengers notwithstanding the cleaning of data caused by the schedule change.

In some embodiments, the DCS 18 and/or transfer module 52 may be configured to generate and store the backup records in response to receiving a notification, such as via an ADL, that a change for a flight has been executed in the inventory system 14 that affects the travel itinerary of one or more passengers. In this way, the backup records generated by the DCS 18 and/or transfer module 52 may relate only to those flights and/or passengers affected by the change, which enables the DCS 18 and/or the transfer module 52 to realize resource savings by not storing backup records for each and every flight and/or passenger handled by the DCS 18. In other words, in response to a schedule change being executed in the inventory system 14 that affects the travel itinerary of one or more passengers, the DCS 18 may generate a backup record for each passenger that includes the passenger data for the passenger that is stored in association with the travel itinerary of the passenger, or more particularly in association with the affected flight of the travel itinerary. Later, when a transfer to a new travel itinerary is initiated for these passengers, for each passenger, the passenger data transferred to the one or more DCS records for the one or more new flights that replace the affected flight may be from the backup record for the passenger.

The reservation system 12 and/or transfer module 52 may also store a history for each reservation record stored in the reservation record database 58 that is subject to a change, such as because of a schedule change. This history may be referred to herein as a "PNR history", and may be included in the corresponding reservation record. Specifically, the PNR history may include details of a previous travel itinerary on which a passenger was booked. Along with the backup records, the process 100 may also utilize the PNR history when necessary, such as to determine a passenger's disrupted travel itinerary for matching new flights with replaced flights, which is described in further detail below.

In some embodiments, in response to a schedule change being executed in the inventory system 14, the inventory system 14 and/or transfer module 52 may be configured to automatically trigger the transfer process 100. In particular, the inventory system 14 and/or the transfer module 52 may be configured to automatically select one or more alternative travel products for a new travel itinerary for the passengers adversely affected by the schedule change. For example, the travel itinerary of several passengers may include a common flight segment, the schedule change may relate to the common flight segment, and may be within the common flight segment's operational window. Accordingly, each of the several passengers may be adversely affected by the schedule change. In any event, the inventory system 14 and/or the transfer module 52 may select the alternative travel products for the new travel itinerary based on rules and/or parameters defined by the airline associated with the schedule change, and/or based on which available alternative travel products most closely match the flight or flights affected by the schedule change.

In connection with the travel process 100 being automatically triggered in response to a schedule change, the inventory system 14 and/or transfer module 52 may be configured to operate in either an automated mode or a guided mode.

When running in the automated mode, once the one or more alternative travel products have been selected, the inventory system 14 and/or transfer module 52 may be configured to automatically proceed with the rest of the transfer process 100. When running in the guided mode, however, the inventory system 14 and/or transfer module 52 may first give the inventory agent, such as via a GUI generated by the inventory system 14 and/or the transfer module 52, a chance to accept or change the selected alternative travel products before proceeding.

In other embodiments, in response to a schedule change, the inventory system 14 and/or transfer module 52 may be configured to automatically prompt an inventory agent, such as via a GUI generated by the inventory system 14 and/or the transfer module 52, to manually select one or more alternative travel products for inclusion in a new travel itinerary for the passengers adversely affected by the schedule change, such as using the screens of the GUI described above in connection with the DCS 18. Alternatively, the transfer module 52 and/or inventory system 14 may not be configured to take any action relative to transferring passengers in response to a schedule change being executed in the inventory system 14. In this case, the inventory agent may either manually access a GUI generated by the inventory system 14 and/or the transfer module 52 to make selections and trigger the transfer process 100, which is described above in connection with the DCS 18, or do nothing, and leave it to the DCS agents to sort out any disrupted passengers via the DCS 18.

As illustrated in FIG. 4, after the transfer request 54 is received, a determination may be made of whether the transfer request 54 is valid (block 104). In particular, the transfer module 52 may be configured to check that the submitting agent has permission to trigger the transfer, such as by retrieving stored permission data associated with the agent's login information. Alternatively, the agent's permission for the trigger may be assumed based on the agent being able to log in and access the transfer module 52, such as via a computer terminal connected to the DCS 18 or the inventory system 14. In other words, only certain user logins may receive access to the GUI that enables an agent to trigger a transfer request.

Block 104 may also include determining whether the data included in the transfer request 54 satisfies a plurality of checks. For example, the transfer module 52 may perform a routing check, a flight order check, a negative connections check, a flight status check, a cross-carrier transfer check, a transfer status check, a passenger type and booking status check, and/or a schedule check. Each of these checks is described in more detail in the following paragraphs.

The routing check may include checking that the new travel itinerary and the disrupted travel itinerary in the transfer request 54 have a same routing. Specifically, the transfer module 52 may ensure that the new travel itinerary includes the same origin, connection points, and destination (e.g., same airports, same cities) as the disrupted travel itinerary. If not, then the transfer module 52 may determine the transfer request 54 is invalid. The routing check may include one or more exceptions that enable a transfer request 54 violating the above test to pass or bypass this check. For example, if a transfer request 54 is submitted by an agent having supervisor-level permissions, then the transfer request 54 may bypass, either automatically or in response to an express indication by the agent, the routing check.

The flight order check may include checking that the sequence of flights in the new travel itinerary is logical. In particular, the transfer module 52 may verify that the sequence of flights in the new travel itinerary is correct. For example, if the new travel itinerary includes a flight from A to B and a flight from B to C, and the flight from A to B departs after the flight from B to C, then the transfer module 52 may determine the transfer request 54 is invalid.

The negative connections check may include checking that the sequence of flights in the new travel itinerary does not form a negative connection. In particular, for each flight in the new travel itinerary, the transfer module 52 may verify that the flight either arrives in the passenger's ultimate destination or in a destination in which a subsequent flight departs. Thus, even if the new travel itinerary retains flights from the disrupted travel itinerary, the new flights included in the new travel itinerary may need to connect to the retained flights in order for the new travel itinerary to satisfy this check. Like the routing check, the negative connections check may include one or more exceptions that enable a transfer request 54 violating the above test to pass or bypass the negative connections check. For example, if a transfer request 54 is submitted by an agent having supervisor-level permissions, then the transfer request 54 may bypass, either automatically or in response to an express indication by the agent, the negative connections check.

The flight status check may include checking that the passenger can be offloaded from one or more flights in the disrupted travel itinerary, such as the replaced flights that at least one of the passengers in the transfer request 54 has already checked into. In addition, the flight status check may include checking that passengers can or will be able to be accepted and boarded onto one or more flights of the new travel itinerary, such as the open flights of the new travel itinerary that the passengers have not yet checked into and/or the new flights. In particular, the transfer module 52 may query and/or cause the DCS 18 to verify that the status of each of the one or more flights in the disrupted travel itinerary will allow any checked-in passengers to be offloaded. For example, if one or more of the passengers of the transfer request 54 have already checked into one of the replaced flights of the disrupted travel itinerary, the transfer module 52 and/or DCS 18 may verify that the status for that flight does not indicate that check-in for the flight is finalized. Similarly, the transfer module 52 may query and/or cause the DCS 18 to verify that the status for each of the one or more flights in the new travel itinerary indicates that the flight is open for check-in and/or has not yet departed. If the transfer module 52 and/or DCS 18 is unable to make these verifications, then the transfer module 52 may determine that the transfer request 54 is invalid.

The cross-carrier transfer check may include checking that any transfers between carriers resulting from the new travel itinerary is permitted according to a partnership agreement between the carriers and/or defined business rules. In particular, the transfer module 52 may query a database storing details of partnership agreements and/or business rules to verify that the cross-carrier transfer is permitted. If not, then the transfer module 52 may determine the transfer request 54 is invalid.

The transfer status check may include checking that there is no other transfer in progress for any of the selected passengers. If the transfer module 52 determines that another transfer is in progress for one or more of the selected passengers, the entire transfer request 54 may be determined invalid. Alternatively, the transfer module 52 may determine that the transfer request 54 is invalid relative to the passengers for whom a transfer is already in progress, but not as to the other selected passengers.

The passenger type and booking status check may include checking that each passenger is eligible for a transfer based on the passenger's type and booking status. For example, business rules and regulations may prevent an infant from being transferred on his or her own. Thus, if the transfer request 54 implicates a transfer of an infant on his or her own, then the transfer module 52 may determine the transfer request 54 is invalid. As another example, business rules and regulations may indicate that, when a passenger's booking is cancelled by a travel agent, the passenger cannot be transferred to a new travel itinerary by a DCS agent via the DCS 18. Thus, if the transfer request 54 implicates such a situation, then the transfer module 52 may determine the transfer request 54 is invalid.

The schedule check may include checking the validity of one or more flights indicated in the transfer request 54, such as the new flights in the new travel itinerary. In particular, the transfer module 52 and/or inventory system 14 may be configured to check the one or more flights identified in the transfer request 54 against schedule data in the inventory database 60. If a discrepancy exists, the transfer module 52 and/or inventory system 14 may determine that the transfer request 54 is invalid.

In response to all or part of the transfer request 54 being determined invalid ("No" branch of block 104), such as due to failing to satisfy one of the above-described checks, then in block 106, an error notification may be generated and presented to the requesting agent in the transfer report 56. The error notification may include a reason for the invalidity, such as an indication of the check that the transfer request 54, or that a passenger of the transfer request 54, failed to satisfy. In some embodiments, if the transfer request 54 is determined invalid relative to any one passenger, then the entire process 100 may be discontinued. In alternative embodiments, the process 100 may continue on behalf of those passengers for which the transfer request 54 is valid only, thereby enabling the process 100 to continue notwithstanding the occurrence of an invalidity error.

In response to all or part of the transfer request 54 being determined valid ("Yes" branch of block 104), in block 108, one or more of the flights implicated by the transfer request 54, such as the replaced flights and/or the new flights, may be locked out from other processes. In particular, the transfer module 52 may call and/or cause the inventory system 14, and/or one or more other systems of the operating environment 10, to prevent one or more of the implicated flights from being affected by a conflicting process external to the process 100. In this way, conflicts between the process 100 and other processes, such as a schedule change or an auto-waitlist trigger involving one or more of the indicated flights, may be avoided. These locks may be removed after the process 100 is completed, or after at least some of the subsequent sub-processes of the process 100 are completed (e.g., after the reservation and inventory databases are finished being updated).

More particularly, due to the integrated nature and varying roles of the systems of operating environment 10, several different processes able to be initiated through different ones of the systems of operating environment 10 may affect one or more of the flights implicated by the transfer request 54. Thus, running such processes in parallel with the process 100 may adversely affect the integrity of data stored on one or more of the systems of operating environment 10 and/or in the databases of processing architecture 50, which in turn may cause one or more of the systems and/or the databases to cease to function correctly, and, in a worst case scenario, to crash. Thus, by locking one or more of the flights implicated by the transfer request 54 from conflicting processes early on in the process 100, such as before the process 100 is configured to make changes to data relating to the indicated flights in the one or more systems of operating environment 10 and/or in the databases of processing architecture 50, the likelihood of these problems arising is reduced. Consequently, such locking improves the integrity and the stability of the systems in operating environment 10 and the databases of processing architecture 50.

After one or more of the indicated flights are locked, in block 110, the data in the transfer request 54 may be subject to preliminary processing. In particular, the transfer module 52 may analyze the flights of each disrupted travel itinerary and the new travel itinerary to determine the relationships between the flights of each travel itinerary, and/or apply changes to one or more of the flights in the new travel itinerary according to preferences of the airline performing the transfer. Although the illustrated embodiment shows block 110 as occurring after the validation determination in block 104 and the flight locking in block 108, in other embodiments, block 110 may occur prior to and/or at least partly in parallel with block 104 and/or block 108.

In some embodiments, block 110 may include constructing FROM-TO matching between the replaced flights in a disrupted travel itinerary and the new flights in the new travel itinerary. In particular, the transfer module 52 may match each new flight in the new travel itinerary to the flight in the disrupted travel itinerary replaced by the new flight. If a flight in the disrupted travel itinerary is replaced by multiple flights in the new travel itinerary, then each of the multiple flights may be matched to the same flight in the disrupted travel itinerary.

When booking and/or transferring a passenger onto a new flight, the FROM-TO matching may enable the transfer module 52 to utilize data stored for the passenger in relation to the flight of the disrupted travel itinerary that is matched to the new flight. Thus, instead of an agent having to manually re-enter certain data items for each passenger being transferred, which is common in the conventional systems, and which may delay the transfer process and increase the occurrence of errors, the transfer module 52 may be configured to automatically copy and utilize the already stored data for each passenger. Consequently, the one or more computer systems performing the transfer are able to realize faster response times relative to the moment in which an agent triggers a passenger transfer and the transfer is completed. Moreover, the one or more computer systems are able to realize improved results, as the likelihood of errors during the passenger transfer is reduced. Non-limiting examples of previously stored data for a passenger that may be utilized by the transfer module 52 in the transfer process 100 include any special status applied to the passenger, the passenger's previous booking class, creation date of the passenger's original reservation, point of sale for the original reservation, service requests in the original reservation, and the passenger's seat preference, each of which may be part of the reservation record for the passenger that is stored in the reservation record database 58. The transfer module 52 may also utilize information in the passenger's DCS records (or backup records) related to the disrupted travel itinerary that are stored in the DCS database 66, such as the passenger's previous check-in details, and may utilize the E-tickets and EMD coupons stored for the passenger in the E-ticket database 62 and EMD coupon database 64, respectively.

The transfer module 52 may be configured to construct the FROM-TO matching as follows. If only one flight in the disrupted travel itinerary is being replaced, then the transfer module 52 may match each new flight in the new travel itinerary to the one replaced flight in the disrupted travel itinerary. If more than one flight in the disrupted travel itinerary is being replaced, then the transfer module 52 may search for and pair similar sub-routings between the replaced flights and the new flights. This search may be based on one or more business rules, which may be defined by the airline performing the transfer. For example, a business rule may dictate that the search be performed on an airport level. In this case, the transfer module 52 may search for and pair a replaced flight or a sequence of replaced flights and a new flight or a sequence of new flights that depart from a same airport and arrive at a same airport. Alternatively, the business rule may dictate that the search be performed at the city level or the country level. In these cases, the transfer module 52 may search for and pair a replaced flight or a sequence of replaced flights and a new flight or a sequence of new flights that depart from a same city or country, respectively, and arrive at a same city or country, respectively.

After sub-routings are paired, for each sub-routing in a pair, the transfer module 52 may identify a main flight. In some embodiments, for a given sequence of flights, the main flight may be the international flight or the longest flight in terms of elapsed flying time. Thereafter, for each pair of sub-routings, the transfer module 52 may match the main flight from the new flight sub-routing to the main flight of the replaced flight sub-routing. Once the main flights are matched for a pair of sub-routings, the feeder and receiver flights of the new flight sub-routing in the pair may be matched respectively to the feeder and receiver flights in the replaced flight sub-routing in the pair. For a given sub-routing, feeder flights may be considered as the flights before the main flight, and receiver flights may be considered as the flights after the main flight. If a new flight sub-routing of a given pair includes feeder flights, and the replaced flight sub-routing of the pair does not, then the feeder flights of the new flight sub-routing may likewise be matched with the main flight of the replaced flight sub-routing. The same rule may also be applied when matching receiver flights of a new flight sub-routing to flights of a replaced flight sub-routing.

In addition to conducting the FROM-TO matching, block 110 may include transforming one or more of the new flights indicated in the transfer request 54. In particular, some flights might be operated by one airline, but be marketed with multiple flight numbers that are each associated with a different airline. This situation may occur when a partnership agreement enables one airline to sell seats on a flight operated by another airline. Thus, for each new flight in the new travel itinerary, the transfer module 52 may determine whether the flight number submitted in the transfer request 54 for the new flight is associated with the same airline as the flight number for the replaced flight matched to the new flight. If not, then the transfer module 52 may determine if a flight number for the new flight is available that is associated with the same airline of the replaced flight. If so, then the transfer module 52 may convert the flight number for the new flight to the flight number associated with the same airline of the replaced flight, and utilize the converted flight number when booking the passenger onto the new flight. In this way, passengers are transferred from flights and to flights of a same airline as much as possible, which enables the airline to retain the transferred passengers as customers and the revenue associated therewith.

For example, a flight from Nice to Paris may be associated with a flight number of X1 for the operating airline and a flight number of Y1 for a marketing airline. One passenger may be booked on this flight under the flight number X1, and another passenger may be booked on this flight under the flight number Y1. If this flight becomes disrupted and these passengers are transferred, an agent may select that both passengers be transferred to another flight that is associated with a flight number of X2 for the operating airline. This flight may also be associated with a flight number of Y2 for the marketing airline. Thus, in response to receiving the transfer request 54, the transfer module 52 may convert the flight number X2 to the flight number Y2 for the passenger originally booked under the flight number Y1. For the other passenger, however, the transfer module 52 may proceed with the flight number X2, as he or she was originally booked under X1.

Following the preliminary processing of block 110, in block 112, the inventory database 60 may be updated based on the transfer request 54, or more specifically based on the new travel itinerary and/or the disrupted travel itinerary of each passenger. In particular, the transfer module 52 may call and/or cause the inventory system 14 to update an availability counter for each new flight in the new travel itinerary and each replaced flight in the disrupted travel itinerary. The transfer module 52 and/or the inventory system 14 may increment a travel product availability counter in the inventory database 60 associated with each new flight, and/or may decrease a travel product availability counter stored in the inventory database 60 for each replaced flight. For example, when the transfer request 54 consists of adding one or more new flights to a passenger's travel itinerary without cancelling or modifying any existing flights, the transfer module 52 may call and/or cause the inventory system 14 to increment a travel product availability counter for each new flight only. As another example, when the transfer request 54 consists of both replacing flights and adding new flights, the transfer module 52 may call and/or cause the inventory system 14 to decrement a travel product availability counter associated with each replaced flight, and increment a travel product availability counter associated with each new flight. The travel product availability counter that is incremented or decremented for a given flight may depend on the booking class for which the flight is booked. In particular, and as described above, a given flight may be associated with several product travel availability counters, each being for a different booking class for the flight.

When updating availability based on the transfer request 54, the transfer module 52 and/or inventory system 14 may also update the ancillary service counters associated with each replaced flight and new flight. In particular, for each passenger and for each new flight in the transfer request 54, the transfer module 52 and/or the inventory system 14 may determine whether the passenger's reservation record stored in the reservation record database 58 includes an ancillary service, such as in an SSR data element, associated with the replaced flight matched with the new flight. If so, then the transfer module 52 and/or inventory system 14 may check whether the ancillary service is available on the new flight, such as based on the total number of bookable units for the ancillary service in relation to the new flight that is stored in the inventory database 60, and based on the counter stored in the inventory database 60 that tracks the number of units of the ancillary service that have been booked in relation to the new flight. If a comparison therebetween indicates that the counter is at least equal to the total number of bookable units, then the ancillary service is not available for the new flight, and the transfer report 56 may be updated to indicate that the ancillary service will not rebooked on the new flight. Alternatively, if the comparison indicates that the counter is less than the total number of bookable units, then the counter associated with the ancillary service may be incremented.

For performance reasons, all of the updates in the inventory system 14 may be performed in a single transaction. In other words, the transfer module 52 may make a single call or provide a single request to the inventory system 14 for all of the passengers and/or travel products involved in the transfer, and the inventory system 14 may update the inventory counters in response to and based on the call or request. For example, the single request may include at least a portion of the disrupted travel itinerary of each passenger (e.g., at least the replaced flights) and at least a portion of the new travel itinerary (e.g., at least the new flights), and the inventory system may update the counters based thereon. In this way, the systems implementing the process 100 are able to realize faster response times, as making separate calls or requests to the inventory system 14 for each travel product and/or passenger implicated by the transfer request 54 reduces the speed in which block 112 is completed. In addition, making a single call or request for all the passengers and/or travel products implicated by the transfer request 54 also enables the counters in the inventory database 60 to be updated in parallel, which further improves the speed in which the systems are able to implement the process 100. Moreover, because each request or call from the transfer module 52 generally requires utilization of additional computer resources by one or more of the systems of operating environment 10, by making a single call or request for all of the implicated travel products and/or passengers, the process 100 is able to realize computer resource savings.

Because the transfer process 100 may not prevent normal sell operations from occurring, it is generally desirable to update the inventory database 60 as soon as possible to accurately reflect the availability for each travel product and ancillary service affected by the transfer. Hence, in the illustrated embodiment, updating the inventory database 60 occurs immediately after the preliminary processing of block 110, which may be a necessary precursor to updating the inventory database 60 (e.g., the FROM-TO matching may be utilized to update the inventory database 60). In this way, assuming no errors occur that cause the transfer process 100 to cancel or completely fail, the inventory database 60 may be up-to-date as soon as possible so as to prevent overbooking and underbooking the travel products and ancillary services affected by the transfer.

Updating the inventory database 60 may also include reseating the passengers on the new flights. In particular, a new seat may be assigned to each passenger for each new flight. In general, the reseating process may take passenger value or status into account, giving priority to the preferences of those passengers of the transfer request 54 having a higher value or status. In the case of reseating a passenger who had previously booked a chargeable seat, the reseating process may attempt to match the previously booked seat to a seat on the new flight based on the characteristics of the purchased seat (e.g., location and accommodations), and parameters defined by the airline (e.g., location trumps accommodations, or vice versa).

Block 112 may be bypassed in certain situations. For example, when the transfer request 54 simply includes timing changes to one or more flights in the disrupted travel itinerary, then the inventory database 60 need not be updated. As another example, when the relevant transfer request 54 includes flights, either new or replaced, that are not managed by the inventory system 14 and/or reservation system 12 (e.g., ground handled flights, external flights), then the inventory counters are generally not accessible for manipulation by the transfer module 52 and/or inventory system 14, and therefore the updating operation may be bypassed for these flights.

In block 114, the reservation record database 58 may be updated based on the transfer request 54, or more specifically on at least a portion of the new travel itinerary of the transfer request 54, such as the new flights. In particular, the transfer module 52 may call and/or cause the reservation system 12 to update the one or more reservation records that are stored in the reservation record database 58 to indicate an association between each selected passenger and the new travel itinerary. This update may entail generating one or more new reservation records in the reservation record database 58 that include an identification and an association between at least one of the passengers and the new travel itinerary, and/or modifying one or more existing reservation records affected by the transfer request 54 in the reservation record database 58. For example, the modification to the one or more existing reservation records may include canceling the disrupted travel itinerary in each of the existing reservation records by removing the disrupted travel itinerary from or indicating a cancellation of the disrupted travel itinerary in the reservation record. Moreover, the modification may include inserting an indication and association between each of the selected passengers of the existing reservation records and the new travel itinerary into the existing reservation records. After the update, the reservation record database 58 may include a reservation record for each transferred passenger that includes the new travel itinerary. Existing reservation records that have been updated to include the new travel itinerary may also include a history, such as the PNR history described above, that contains details related to the disrupted travel itinerary.

In the illustrated embodiment, updating the reservation record database 58 occurs after the inventory database 60 has been updated based on the transfer request 54. While the reservation records are being updated, the transfer module 52 and/or the reservation system 12 may monitor the reservation records to detect whether the inventory database 60 becomes inconsistent with the reservation record database 58. For example, if notwithstanding their availability, the transfer module 52 and/or reservation system 12 is unable to book a passenger onto a flight of the new travel itinerary or unable to re-apply the passenger's previous ancillary services onto the new travel itinerary, then the counters in the inventory database 60 may inaccurately reflect the number of booked travel products or ancillary services in relation to a given flight. Accordingly, when an inconsistency is determined, the transfer module 52 may initiate a rollback process that informs the inventory system 14 of the inconsistency, which may then undo the changes relating to the inconsistency that previously occurred in the inventory database 60. In this way, after block 114 is complete, the inventory database 60 and the reservation record database 58 may be in a synchronized state.

During the reservation record update process of block 114, the transfer module 52 may provide the FROM-TO matching determined in block 110 for inclusion in the new or updated reservation records, such as in a dedicated element entitled PNR Itinerary Matching (PIM). The reservation system 12 and/or transfer module 52 may utilize the FROM-TO matching to reapply a passenger's details, including ancillary services and preferences, onto the new flights. For example, a passenger may initially be booked on a two-flight travel itinerary that includes X1 Nice to Paris and Y2 Paris to New York. If this travel itinerary becomes disrupted, then an agent may submit a transfer request 54 that includes two new flights to replace the old flights, namely X3 Nice to London and Y4 London to New-York. If the FROM-TO matching maps X3 to X1 and Y4 to Y2, then when creating or updating a reservation record for the passenger, and assuming there is availability for the passenger's previously booked ancillary services on the new flights, the reservation system 12 and/or transfer module 52 may reapply the booked services and preferences for the passenger from X1 to X3, and may reapply the booked services and preferences for the passenger from Y2 to Y4. In this way, the passenger's preferences and booked ancillary services are maintained on the new travel itinerary as much as possible.

Updating the reservation records implicated by the transfer request 54 may proceed as follows. For each passenger, the transfer module 52 and/or reservation system 12 may search the reservation records stored in the reservation record database 58 to determine if a reservation record (sometimes referred specifically as a "distribution PNR") for the transferred passenger is available in relation to the disrupted travel itinerary. Such a reservation record may not be available, for example, if the disrupted travel itinerary was booked for the passenger through a reservation system external to the operating environment 10, which may be the case if the disrupted travel itinerary includes ground-handled flights or codeshare flights (e.g., flights operated by an airline that utilizes the reservation system 12, but booked through a marketing airline that does not utilize the reservation system 12). If the reservation record is available for a given passenger, then the transfer module 52 may call and/or cause the reservation system 12 to update the reservation record based on the new travel itinerary. If not, then the transfer module 52 may call and/or cause the reservation system 12 to create a new reservation for the passenger that includes the new travel itinerary. In either case, the transfer module 52 and/or reservation system 12 may input an SSR CKIN element associated with the new travel itinerary into the new reservation record or the found reservation record updated with the new travel itinerary that includes the FROM-TO matching determined above.

In some situations, only some of the passengers of a given reservation record stored in the reservation record database 58 may be implicated by the transfer request 54, meaning that only a subset of the passengers included in a reservation record is to be rebooked onto the new travel itinerary. In this case, the transfer module 52 and/or reservation system 12 may split the reservation record into two or more child reservation records, where one or more of the child reservation records are specific to the disrupted passengers. Thereafter, the transfer module 52 and/or reservation system 12 may update the child reservation records including the disrupted passengers with the new travel itinerary. The PIM element of each child reservation record may be modified to store information relating to the split, such as an identification of the parent reservation record and/or each child reservation record split from the parent reservation record.

In some embodiments, rather than the inventory database 60 being updated for every passenger before the reservation record database 58 is updated, these processes may be performed in parallel for each passenger to improve system response time. For example, a determination may first be made whether one or more of the passengers and/or the passengers' booked ancillary services may be transferred or rebooked onto the new flights of the new travel itinerary, such as via querying the inventory database 60 for the current values of the relevant counters. If so, then the transfer module 52 may call and/or cause the reservation system 12 to rebook in parallel each the passengers and/or their ancillary services onto the new flights. Then, in response to a passenger and/or ancillary service being rebooked onto one or more of the new flights, the transfer module 52 may call and/or cause the inventory system 14 to update the counters in the inventory database 60 to reflect the rebooking. In other words, those counters associated with the replaced flights of the rebooked passenger may be decremented, and those counters associated with the new flights of the rebooked passenger may be incremented. In this way, the counters for the new flights and ancillary services in the inventory database 60 are not updated until a passenger and/or ancillary service has actually been rebooked onto the new flight in the reservation record database 58, which may increase the accuracy and integrity of the inventory database 60 during the transfer process 100. Moreover, by performing the above operations in parallel for each passenger, the system does not have wait for every passenger to be rebooked before performing the inventory update process, or vice versa, which may improve response time of the system.

In some embodiments, as soon one passenger or ancillary service is rebooked onto one or more of the new flights, the transfer module 52 and/or reservation system 12 may begin rebooking a next passenger or ancillary service, and the transfer module 52 and/or inventory system 14 may begin updating the counters for the previous passenger or ancillary service. In this way, the inventory database 60 is updated in parallel with the reservation record database 58, which realizes improved response times for the systems implementing the process 100 as compared to updating one of the databases for all of the passengers, and only after that update is complete, updating the other database for all of the passengers. In an alternative embodiment, each of the passengers or subgroups of the passengers requested to be transferred may be processed in parallel by the inventory system 14 and reservation system 12 (i.e., rebooking and inventory updating is performed for each passenger or passenger subgroup contemporaneously with one another without waiting for an updating to finish for a given passenger or passenger subgroup), which may further realize improved response times for the systems implementing the process 100.

In some situations, the counters in the inventory database 60 may indicate that one or more of the passengers requested for transfer cannot be transferred to the new travel itinerary, or that one or more booked ancillary services cannot be reapplied onto the new travel itinerary. In response, the transfer module 52, inventory system 14, and/or reservation system 12 may be configured to place all of the passengers in a waitlist for the new travel itinerary and/or the one or more ancillary services. Alternatively, the transfer module 52, inventory system 14, and/or reservation system 12 may be configured to implement a best effort process where as many of the passengers and ancillary services are rebooked as possible until no more no more availability remains. Those passengers that are not rebooked onto the new travel itinerary may then not be handled by the rest of the process 100. In the former case, in response to the passengers being waitlisted, the transfer module 52 may update the transfer report 56 to indicate the passengers' waitlisted status. In the latter case, the transfer module 52 may update the transfer report 56 to indicate those passengers that cannot be rebooked and will therefore not be transferred.

After the reservation record database 58 and the inventory database 60 have been updated, in block 116, passengers included in the transfer request 54 that were successfully rebooked and that have already checked-in on the replaced flights of the disrupted travel itinerary may be offloaded from the replaced flights. Specifically, the transfer module 52 may call and/or cause the DCS 18 to offload each checked-in passenger. Alternatively, the reservation system 12, upon the passengers being rebooked, may automatically generate and transmit one or more corresponding messages to the DCS 18 that inform the DCS 18 of the rebookings, or more particularly that the rebooked passengers are no longer booked on the replaced flights, which may in response be configured to automatically offload the rebooked passengers from the replaced flights. Specifically, the corresponding messages may indicate each passenger's previous travel itinerary or replaced flights, each passenger's new travel itinerary or new flights, and/or the FROM-TO matching previously described, which may be stored and later utilized by the DCS 18 for the DCS data transfer process. Offloading a passenger from a given flight causes the passenger's E-ticket and EMD coupons to change to an "open" status relative to that flight. For example, when a passenger is offloaded from a flight, the coupon included in the passenger's E-ticket for that flight may change to an "open" status. In general, each transferred passenger's E-ticket and EMD coupons associated with replaced flights need to be in an open status relative to the replaced flights in order for successful performance of the ticketing portion of the process 100, which is discussed in more detail below.

In some embodiments, the transfer module 52 and/or the DCS 18 may be configured to offload checked-in passengers from the first replaced flight in the disrupted travel itinerary that is hosted by the DCS 18, and from all onward replaced flights, including external flights (e.g., via messages sent to the appropriate external systems). For example, a passenger that needs to be transferred may initially be booked on a disrupted travel itinerary that includes flight X1 and Y1, where X1 is hosted by the DCS 18, and Y1 is external to the DCS 18, but available for check-in on the DCS 18 using through check-in. If X1 is scheduled before Y1, and X1 and Y1 are both replaced in a new travel itinerary, then the transfer module 52 and/or DCS 18 may offload the passenger from both X1 and Y1. Alternatively, if Y1 is scheduled before X1, and both X1 and Y1 are replaced, then the transfer module 52 and/or DCS 18 may offload the passenger from X1 only. As another alternative, if X1 is scheduled before Y1, and only Y1 is replaced, then the transfer module 52 and/or DCS 18 may not perform any offloading operation.

In block 118, one or more automated ticketing operations may be performed for the rebooked and/or offloaded passengers. Specifically, the transfer module 52 may call the ticketing system 16 to automatically process both the E-tickets and the EMD coupons of the passengers for the new travel itinerary. The transfer module 52 and/or ticketing system 16 may exchange or revalidate each E-ticket. Thereafter, the transfer module 52 and/or ticketing system 16 may dis-associate, re-associate, or exchange the EMD coupons. The particular operations of block 116 are discussed in more detail in reference to FIG. 5.

In block 120, a DCS data transfer may be initiated so that the DCS database 66 may be updated to reflect the new travel itinerary for each of the rebooked passengers. In particular, after the rebooking process and the ticketing process are completed, the transfer module 52 and/or reservation system 12 may send data relating to the rebooking and ticketing processes to the DCS 18 in order to trigger the DCS data transfer process. The trigger data may indicate the transferred passengers, the disrupted travel itinerary and/or replaced flights for each passenger, the new travel itinerary, and/or any rebooked ancillary services. In addition, the trigger data may include a transfer transaction ID, a unique identifier for each passenger, rebooking failures, if any, E-ticket identifiers and/or EMD coupon identifiers, and/or ticketing errors, if any. While the DCS 18 is processing the trigger data, the transfer module 52 may update the transfer report 56 to display a new transfer status for each passenger (e.g., processing DCS data transfer).

In response to receiving the above trigger data, the transfer module 52 and/or DCS 18 may determine whether the new travel itinerary includes one or more new flights, and if so, whether those flights are hosted by or external to the DCS 18. If the first new flight in the new travel itinerary is external to the DCS 18, the transfer may be considered completed, as the DCS 18 may not be charged with handling the airport operations for that flight. If not, then for each new flight that is hosted by the DCS 18, the transfer module 52 and/or DCS 18 may initiate a DCS data transfer.

As previously described, when one or more passengers are rebooked from or to flights that are open in the DCS 18, the reservation system 12 may be configured to send a PNL or ADL to the DCS 18, which may trigger the DCS 18 to update the DCS records in the DCS database 66 based on the information included in the PNL or ADL. For example, upon receiving a PNL or ADL after the rebooking, the DCS 18 may be configured to generate one or more DCS records associated with one or more flights of the new travel itinerary that include the rebooked passengers. Occasionally, the trigger data described above may be received prior to the PNL or ADL, in which case the DCS database 66 may not yet include DCS records for the new travel itinerary that include the passengers in which to transfer data. When this occurs, the transfer module 52 and/or DCS 18 may be configured to automatically retry initiating the DCS data transfer after a predetermined period and/or after a PNL and/or ADL is received.

In some embodiments, the trigger data may be received before all of the hosted flights in the new travel itinerary have been opened in the DCS 18. In this situation, the transfer module 52 and/or DCS 18 may wait until each flight in the new travel itinerary operated by a particular one of the airlines (denoted herein as the "prime airline") has been opened in the DCS 18. For example, the prime airline may be the airline associated with the first new flight in the new travel itinerary, and the transfer module 52 and/or DCS 18 may wait until each new flight associated with the prime airline has been opened in the DCS 18 before the data transfer is initiated. For those new flights that are not associated with the prime airline and that have not yet been opened in the DCS 18 when the data transfer is actually initiated, it may be generally assumed that passenger data, such as baggage information and acceptance status, will be added to the DCS record for those flights during a manual check-in triggered by an agent.

In any event, in response to the DCS data transfer process being initiated for one or more passengers, for each passenger, the transfer module 52 and/or DCS 18 may copy or transfer passenger data stored for the passenger in relation to the disrupted travel itinerary, such as in the backup records or DCS records for the passenger associated with the disrupted travel itinerary in the DCS database 66, to the DCS records for the passenger that are included in the DCS database 66 and associated within the DCS database 66 to the new travel itinerary, or more particularly to the new flights of the new travel itinerary. At least some if not all of this transferred data may be absent from the reservation records for the passengers, and accordingly, may be absent from a PNL or ADL provided to the DCS 18 after the passengers are rebooked. For example, while changes to special service requests (SSR's) relating to services purchased or requested by a passenger may be stored in a reservation record and corresponding received by the DCS 18 via a PNL or ADL, certain regulatory data (e.g., passport numbers, APIS data) may be absent. Accordingly, the DCS data transfer process helps alleviate the loss of such data.

The specific source of data from which passenger data is copied or transferred to each DCS record associated with the new travel itinerary may be fine-tunable by the various airlines, or may be based on the FROM-TO matching determined above. More particularly, for a DCS record associated with a new flight of the new travel itinerary, for a given passenger, some passenger data may be copied or transferred from the backup record or DCS record for the passenger that is associated with the replaced flight matched to the new flight, while other data may be copied or transferred from another source. The source of data may largely depend on the type of data being copied or transferred. Table 1 illustrates an exemplary mapping of data types and data sources for the DCS data transfer relative to each new flight for each passenger. The transfer module 52 and/or DCS 18 may utilize table 1 by default absent any particular rules from an airline.

TABLE 1

| Data Type | Source |
|---|---|
| Nationality | Flight mapped in FROM-TO matching |
| Country | Flight mapped in FROM-TO matching |
| Valid doc Indicator | Flight mapped in FROM-TO matching |
| Baggage waiver | Flight mapped in FROM-TO matching |
| Transit Visa indicator | Flight mapped in FROM-TO matching |
| Manual Selectee Data | Flight mapped in FROM-TO matching |
| Place of birth | Flight mapped in FROM-TO matching |
| Transfer counts (for auto-transfer process) | Flight mapped in FROM-TO matching |
| Acceptance time | Flight mapped in FROM-TO matching |
| Regulatory Data (e.g., passport number) | Flight mapped in FROM-TO matching |
| Advance Passenger Information System (APIS)/Advanced Passenger Processing (APP)/APIS Quick Query (AQQ) Data | Same flight transfer only (e.g., transfer is a result of a schedule change) |
| High Priority comments | Flight mapped in FROM-TO matching |
| Seat preference | First replaced flight |
| Locked seat | First replaced flight |

During the DCS data transfer process, if baggage information has been generated and stored for a given transferred passenger relative to the disrupted travel itinerary, the transfer module 52 and/or DCS 18 may modify the baggage information to include a baggage itinerary based on the new travel itinerary, and add the modified baggage information to the DCS records for the given passenger that are associated with the new travel itinerary. In particular, the transfer module 52 and/or DCS 18 may remove replaced flights from the baggage itinerary, and may add the new flights of the new travel itinerary to the baggage itinerary. Bag tag numbers included in the baggage information, which may be physically attached to the passenger's baggage, may not be altered and may also be included in the modified baggage information. If the baggage information for a particular passenger indicates that the baggage was short tagged (i.e., the baggage itinerary ends at a destination that is a connection point prior to the passenger's final destination), then the transfer module 52 and/or DCS 18 may determine whether the short-tagged destination in the original baggage itinerary is included in the new travel itinerary. If so, then the transfer module 52 and/or DCS 18 may accept the passenger's baggage at this destination again. Alternatively, if the baggage is short-tagged and the new travel itinerary does not include the baggage's original destination, then the transfer module 52 and/or DCS 18 may accept the baggage onto and the complete new travel itinerary such that the baggage will be handled to the passenger's final destination. After the baggage information has been modified, the transfer module 52 and/or DCS 18 may send the updated baggage information to the appropriate baggage handling systems.

In block 122, after the DCS data transfer has completed, the transferred passengers may be checked-in (or accepted) onto one or more of the flights in the new travel itinerary. In particular, for each passenger, if the passenger was accepted or on standby on one or more flights of the disrupted travel itinerary, such as the first replaced flight, then the transfer module 52 and/or DCS 18 may attempt to re-accept the passenger onto one or more flights of the new travel itinerary. Alternatively, if the agent selected the relevant option when creating the transfer request 54, the transfer module 52 and/or DCS 18 may accept each customer as a standby passenger rather than as a fully accepted passenger on the one or more flights of the new travel itinerary. The passengers may then be fully accepted onto the flights via normal standby protocols (e.g., at some time before the flight, one or more of the standby passengers may be fully accepted on a priority basis).

As part of the DCS data transfer process or the acceptance process, the transfer module 52 and/or DCS 18 may also verify that a minimum connection time is respected for the new travel itinerary, such as between the last new flight in the new travel itinerary and the next flight in new travel itinerary. For example, a disrupted travel itinerary may include three flights, namely X1, X2, and X3 in sequence, and a new travel itinerary may include Y1, Y2, and X3 in sequence. In this case, the transfer module 52 and/or DCS 18 may verify that the minimum connection is respected between Y2 and X3. If so, then the transfer module 52 and/or DCS 18 may proceed with the DCS data transfer and/or with accepting the transferred passengers onto the new travel itinerary, as outlined above. If not, then the transfer report 56 and/or DCS 18 may cause the transfer report 56 to include an error and a rational (e.g., DCS data transfer or passenger acceptance could not be completed due to a failure to satisfy the minimum connection time requirement). Alternatively, if the minimum connection time is not satisfied, then the transfer module 52 and/or DCS 18 may continue to perform the DCS data transfer and/or accept the passengers onto the new travel itinerary, but generate a warning in the transfer report 56 that the minimum connection time is not satisfied. In addition and/or alternatively, this check may be performed in the validation process of block 104.

In block 124, the transfer report 56 may be finalized and presented to the agent. In particular, the transfer module 52 may generate data representative of the transfer report 56, which may be a single consolidated display that summarizes the results of the transfer process 100. The transfer module 52 may then present the data representative of the transfer report 56 to the agent, such as via a computer terminal connected to the DCS 18 or the inventory system 14.

The transfer report 56 may include several items that summarize the outcome of the transfer process 100. For example, the transfer report 56 may include a global transaction result, such as "completed", "completed with errors", "completed with warnings", "incomplete", or "ongoing" for all the requested passengers. The transfer report 56 may also include and/or identify the number of passengers that were successfully rebooked onto the new travel itinerary, the number of passengers for which services (e.g., SSR's) were successfully reapplied onto the new travel itinerary, the number of passengers for which E-tickets and EMD-coupons were successfully processed relative to the new travel itinerary, the number of passengers for which data was successfully transferred within the DCS database 66, and/or the number of passengers that were successfully accepted onto one or more flights of the new travel itinerary. Similarly, the transfer report 56 may include the number of passengers that were unsuccessful relative to the above processes.

The transfer report 56 may also include details about the outcome of each sub-process in the process 100 for each passenger of the transfer request 54. Specifically, for each passenger, the transfer report 56 may include a rebooking result, service re-processing results, which e-ticket operation was performed for the passenger (e.g., revalidation or exchange), which EMD-coupon operations were performed for the passenger (e.g., de-association, re-association, or exchange), whether or not data was successfully transferred for the passenger within the DCS database 66, and/or whether the passenger was successfully accepted onto one or more flights of the new travel itinerary. Moreover, if any these processes resulted in a failure or a warning, a corresponding error or warning may be provided for the passenger in the transfer report 56.

In other words, the transfer report 56 may provide a single, comprehensive display to the agent that summarizes the transfer process 100 relative to each passenger. The agent may therefore utilize the transfer report 56 to quickly identify problems for each passenger, and manually correct such problems for the passengers accordingly (e.g., manually exchange an E-ticket, manually enter data into the DCS database 66). Moreover, if a passenger lost a booked service during the travel process 100, such as a chargeable seat, the transfer report 56 may enable an agent to quickly identify the lost service, such as via a specific icon associated with the passenger within the transfer report 56.

In some embodiments, an airline may define a set of specific instructions for the transfer module 52 to perform in response to a failure or error, such as a service or chargeable service failing to be rebooked onto the new travel itinerary, as reported on the transfer report 56. For example, in response to losing a chargeable service in the transfer process 100, an airline may define instructions for the transfer module 52 to automatically queue the relevant reservation record at a particular airline office, such as to process a refund, and/or to add an indication, such as an "SSR OTHS" element, in the relevant reservation record that the chargeable service was lost during a transfer.

Figure 5:
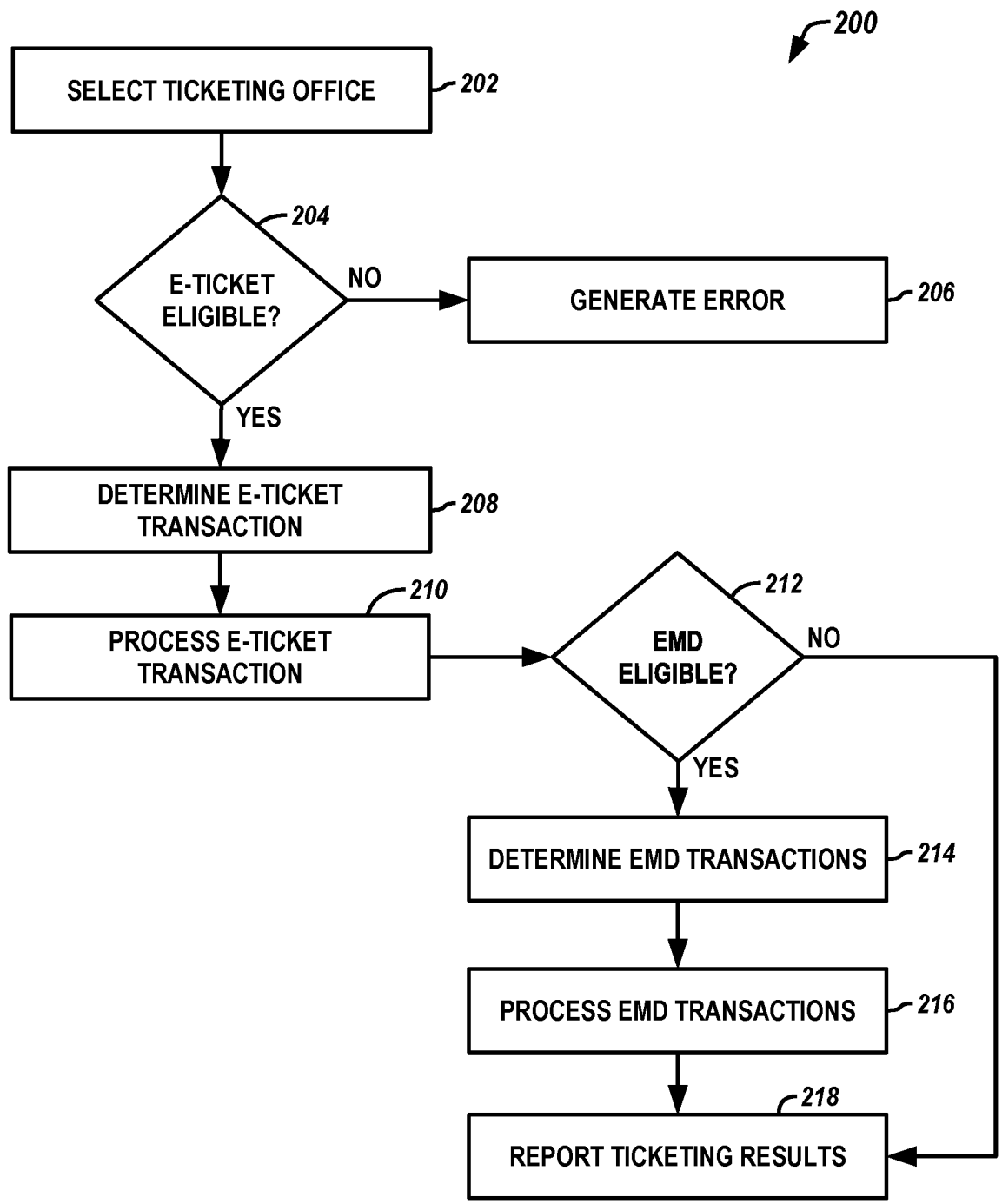
FIG. 5 is a flowchart of an exemplary process for performing ticketing operations that may be included in the process of FIG. 4.

FIG. 5 illustrates a process 200 for performing the automated ticketing operations of block 118 in the transfer process 100. The process 200 may be performed by the transfer module 52 and/or the ticketing system 16. In particular, and as previously described, during the transfer process 100, the transfer module 52 may call and/or cause the ticketing system 16 to automatically handle processing of both the E-tickets and the EMD coupons for the transferred passengers. Thereafter, the ticketing system 16 and/or transfer module 52 may perform the process 200.

In block 202, a ticketing office in which to perform the ticketing transactions may be selected. The choice of ticketing office determines which airline is the "validating carrier", which may generally refer to the carrier that validates and/or issues tickets to the passengers, collects/receives payment from the passengers for the new travel itinerary, distributes the payment to the operating airlines involved in the new travel itinerary, and/or issues refunds or credits.

The transfer module 52 and/or ticketing system 16 may select a ticketing office using the following logic. If the airline that triggers the transfer has a ticketing office in which the ticketing transactions can be performed, then the transfer module 52 and/or ticketing system 16 may select the ticketing office of the triggering airline. Otherwise, the transfer module 52 and/or ticketing system 16 may select the ticketing office of the operating airline of the impacted flight (e.g., the airline operating the flight at the origin of the disrupted travel itinerary).

The above logic enables the process 200 to work with ground handled flights in addition to other flights hosted by the DCS 18. Specifically, for a ground-handled flight, the ground handler or airline that is requesting the transfer may not have a ticketing office that can perform the ticketing transactions of process 200 on behalf of the airline operating the ground-handled flight, as the ground handled-flight may be external to the ground handler's or airline's systems. However, the operating airline of the ground-handled flight should have a ticketing office that is capable of performing the ticketing operations for the ground-handled flight, and this ticketing office may be selected using the above logic.

If, using the above logic, the transfer module 52 and/or ticketing system 16 is unable to determine a ticketing office, then the transfer module 52 and/or the ticketing system 16 may discontinue the process 200. In this case, the rest of the transfer process 100 may proceed, and the transfer module 52 may update the transfer report 56 to include a statement that the ticketing process failed. The transfer report 56 may also include the reason for the failure (e.g., ticketing office unavailable).

In block 204, in response to a ticketing office being selected, a determination may be made whether each passenger in the transfer request 54 is eligible for an automated E-ticket transaction. For example, the transfer module 52 and/or ticketing system 16 may check whether one or more of the new flights in the new travel itinerary are operated by ticketless airlines. If so, then none of the passengers may be eligible for automated E-ticket transactions, at least not relative to these flights. Another check may include checking if the transfer request 54 includes an infant. If so, then the infant may need his or her own E-ticket. If the infant does not have his or her own E-ticket, then the transfer module 52 and/or ticketing system 16 may determine that the infant passenger, and/or any passengers traveling with the infant, is not eligible for an automated E-ticket transaction. A further check may include checking if the passenger name on each E-ticket (and EMD coupon) implicated by the transfer request 54 and to be processed in the process 200 matches one of the passenger names included in the transfer request 54, which may be carried over from the relevant reservation records stored in the reservation record database 58 (e.g., the names presented to the agent for selection may be generated from reservation records in the reservation record database 58). In general, this check may ensure consistency of the process and avoid potential fraud, thereby increasing security of the overall system. If a passenger name included in the transfer request 54 differs from the passenger name on an E-ticket or EMD coupon to be processed for the passenger, then the transfer module 52 and/or ticketing system 16 may determine that this passenger of the transfer request 54 is not eligible for an automated E-ticket transaction.

The transfer module 52 and/or ticketing system 16 may also check that each of the E-tickets (and EMD coupons) implicated by the transfer request 54 and to be processed in the process 200 have an "open" status, at least relative to the replaced flights. If one of the E-tickets still has a "checked-in" status relative to the replaced flights, then the transfer module 52 and/or ticketing system 16 may implement a retry mechanism that performs this check again after a small delay in order to leave more time for the E-ticket to gain an "open" status relative to the replaced flights. This retry may be performed several times, and if the E-ticket still shows a "checked-in" status relative to the replaced flights, then the transfer module 52 and/or ticketing system 16 may determine that the passenger associated with the E-ticket is not eligible for an automated E-ticket transaction.

Further in block 204, the transfer module 52 and/or ticketing system 16 may determine which E-tickets to perform the above checks and/or to process in the remaining parts of the process 200. A smart logic may be utilized to determine the relevant E-tickets, that is, the E-ticket or E-tickets for each passenger that correspond to the disrupted travel itinerary, and more particularly that include coupons for the replaced flights. In particular, for each transferred passenger, and for each replaced flight, the transfer module 52 and/or ticketing system 16 may utilize a prioritized list of data sources to determine an E-ticket for the passenger for the flight. For example, the transfer module 52 and/or ticketing system 16 may check whether the flight has been associated with an E-ticket identifier in the DCS 18 for the passenger. If not, then the transfer module 52 and/or ticketing system 16 may check whether the passenger name record for the passenger that includes the flight has an E-ticket identifier in an FA element for the flight, which represents an E-ticket identifier that was automatically added to the passenger name record by the reservation system 12 upon the passenger being booked onto and ticketed for the flight. If still no E-ticket number is found, then the transfer module 52 and/or ticketing system 16 may check whether the passenger name record for the passenger that includes the flight includes an E-ticket number in an FHE element for the flight, which represents an E-ticket identifier that was manually entered by an agent when the booking was created. Once an E-ticket identifier is selected for each replaced flight for a passenger, a determination may be made of whether the E-tickets associated with the selected identifiers match the replaced flights, such as by displaying each of the E-tickets and determining whether the E-tickets include coupons for the replaced flights. If a full match is found, then one or more of the E-tickets corresponding to the identifiers are selected for the above checks and/or remaining parts of the process 200 for the passenger. If not, a determination may be made that the passenger is not eligible for an automated E-ticket transaction.

If one or more of the passengers are determined ineligible for an automated E-ticket transaction ("No" branch of block 204), then control is transferred to block 218, the transfer report 56 may be updated to indicate an E-ticket ineligibility error and/or the reason for the error, and the process 200 may be discontinued. Alternatively, the transfer report 56 may be updated to indicate an error only for those passengers that are determined ineligible for an automated E-ticket transaction relative to one or more of the new flights. In this case, the process 200 may proceed to perform ticketing transactions for passengers determined eligible relative to one or more of the new flights. In some scenarios, a given passenger may be ineligible relative to one new flight in the new travel itinerary, and eligible relative to another new flight in the new travel itinerary. In this case, the passenger may be indicated as ineligible in the transfer report 56 for the one new flight, and the process 200 may continue for the passenger in connection with the other new flight.

In response to one or more of the passengers being determined eligible for an automated E-ticket transaction relative to one or more of the new flights ("Yes" branch of block 204), then in block 208, a type of E-ticket transaction may be determined for each eligible passenger, such as from the group consisting of an E-ticket revalidation transaction and an E-ticket exchange transaction. Specifically, the transfer module 52 and/or ticketing system 16 may select a revalidation transaction or an exchange transaction for each eligible passenger. In general, a revalidation transaction may include updating an existing E-ticket with the new flight details, and may only be possible if the new travel itinerary includes the same routing, date, and class as the disrupted travel itinerary. In addition, an airline may define certain baseline conditions that need also be met for an E-ticket revalidation transaction to be selected so as to increase revalidation success rate.

If revalidation is unavailable for a given passenger, then the transfer module 52 and/or ticketing system 16 may select an E-ticket exchange transaction for the given passenger. An E-ticket exchange transaction may include issuing a new E-ticket for the new travel itinerary with a new ticketing number or identifier. In some embodiments, prior to processing the exchange transaction (or a revalidation transaction for that matter), the transfer module 52 and/or ticketing system 16 may perform an additional check to confirm whether the time before departure of the next non-departed and/or new flight in the new travel itinerary is greater than a predetermined time. If so, then the process 200 may be discontinued so as to leave the exchange (or revalidation) in the hands of the validating carrier connected with one or more of the passenger's previous E-tickets. In this way, the validating carrier avoids losing control of E-tickets that they have issued. This predetermined time may be separately configured by each airline.

In some embodiments, only one E-ticket transaction may be performed for each eligible passenger. In this way, the transfer module 52 and/or ticketing system 16 are able to avoid partial failures for a given passenger (i.e., some E-ticket transactions succeeding and some E-ticket transactions failing for a given passenger). Furthermore, limiting each passenger to one E-ticket transaction a piece may reduce system response time, and may ease manual processes, if any, performed by the agent. Thus, if, for a given passenger, two or more E-tickets are determined that include the replaced flights of the disrupted travel itinerary, then the passenger may be limited to an exchange transaction in order to abide by the one E-ticket transaction per passenger rule.

In block 210, the type of E-ticket transaction determined for each eligible passenger may be processed on one or more of the passenger's E-tickets, such as the E-ticket or E-tickets identified in block 204. In some embodiments, all of the E-ticket transactions for the transfer request 54 may be triggered via one request sent by the determined ticketing office and/or transfer module 52 to the ticketing system 16 that includes the E-ticket transaction type determined for each passenger, which realizes improved system response time (e.g., multiple requests necessitate the usage of additional computer resources and increased response time as compared to a single request). However, in response to the single request being rejected by the ticketing system 16, each E-ticket transaction may be retried on a passenger by passenger basis. More particularly, the transfer module 52 and/or the determined ticketing office may generate a separate ticketing request for each passenger so as to trigger the ticketing system 16 to process each determined E-ticket transaction one at a time.

While the E-ticket transactions are being processed, the usual interline agreements between the impacted airlines may be checked as well. If an error occurs in this process for a given passenger or E-ticket, a remark may be added to the relevant reservation record in the reservation record database 58 that includes the failed E-ticket identifier or number, which may ease the agent's identification of an E-ticket that needs manual processing. Otherwise, reference to an E-ticket identifier or number may otherwise be missing from the relevant reservation record, such as if the E-ticket was only manually associated in the DCS 18 and not in the reservation record, or if a new reservation record was created for the passenger during the transfer process 100, which may hinder the agent's attempts to fix the E-ticketing error.

In response to the E-ticket transactions being performed for each passenger, EMD coupons may begin to be processed for each passenger. In order to process the EMD coupons for a given passenger, the E-ticket transaction for the passenger may need to have been successful, as a valid E-ticket may be needed in order for an EMD coupon to be processed and associated therewith. In other words, processing EMD coupons may not begin until the processing of E-tickets for the transferred passengers is finished.

In block 212, one or more EMD coupons associated with the passengers may be determined, each of the EMD coupons being for the disrupted travel itinerary of one of the passengers, and a determination may be made of whether each of the EMD coupons associated with the passengers is eligible for automated processing. In particular, the transfer module 52 and/or ticketing system 16 may identify EMD coupons of the passengers in connection with the replaced flights, such as by using the same priority-based process performed to determine the E-tickets to be checked and/or processed discussed above. The determination of whether each EMD coupon is eligible to be automatically processed may be based on whether the passenger associated with the EMD coupon was confirmed on the new flight during the rebooking process (block 114 of the process 100) discussed above, and/or whether the E-ticket transaction for the passenger associated with the EMD coupon was successfully performed in connection with the new flight. Specifically, if a passenger was not confirmed onto a new flight, or a valid E-ticket does not exist for a passenger in connection with the new flight, then an EMD coupon may not be able to be automatically processed for the new flight for the passenger.

If one or more (or alternatively if all) of the EMD coupons are determined eligible for automated processing ("Yes" branch of block 212), then block 214 may be performed for the eligible EMD coupons. In block 214, for each EMD coupon determined eligible for automated processing, a type of EMD transaction may be selected, such as from the group consisting of an EMD dis-association transaction, an EMD re-association transaction, and an EMD exchange transaction. For example, the transfer module 52 and/or ticketing system 16 may select an EMD dis-association transaction if the service associated with the EMD coupon could not be reapplied onto the new flight, such as during the rebooking process (block 114 of the process 100) discussed above. In general, performing an EMD dis-association transaction for a given EMD coupon may include changing the status of an "in connection with" link on the EMD coupon (and on any related E-ticket) to disassociated, and/or removing the unique identifier of the related E-ticket from the EMD coupon, and/or vice versa.

Alternatively, the transfer module 52 and/or ticketing system 16 may select an EMD re-association transaction if the service associated with the EMD coupon was reapplied onto the new flight during the rebooking process, and the new flight includes only minor changes relative to the replaced flight mapped to the new flight. In general, performing an EMD re-association transaction for a given EMD coupon may include changing the status of the "in connection with" link for the EMD coupon (and for the related E-ticket) to associated, and/or adding the unique identifier of the related E-ticket to the EMD coupon, and/or vice versa. As a non-limiting example, a change of airport, a change in the number of flights (e.g., a replaced flight is mapped to multiple new flights), and/or a change in operating carrier may be considered outside the scope of "minor changes".

As a further alternative, the transfer module 52 and/or ticketing system 16 may select an EMD exchange transaction for the EMD coupon. This may occur, for example, if an EMD coupon is not eligible for either an EMD dis-association transaction or an EMD re-association transaction. As a further example, if an exchange E-ticket transaction is determined and processed for a passenger in blocks 208 and blocks 210 of the process 200, then the transfer module 52 and/or the ticketing system 16 may select an EMD exchange transaction for all of the EMDs of the passenger associated with the exchanged E-ticket, as the selection of an E-ticket exchange transaction for the E-ticket implies changes beyond those that are minor. In order to perform an EMD exchange transaction, the relevant reservation record may be updated with baseline information that may be necessary to perform the EMD exchange, such as a TSM-P element, an FO line, the form of payment, etc.

In block 216, the eligible EMD coupons may be processed according to the determined transactions. Similar to the E-ticket process described above, a remark including old EMD coupon numbers may be added to each relevant reservation record in case errors occur. In some embodiments, each EMD transaction may be processed immediately after the EMD transaction is determined, and/or one or more EMD transactions may be processed in parallel. In this way, system response time may be reduced.

In block 218, after both the E-ticket process and the EMD process are finished for the passengers, the results of the process may be summarized in the transfer report 56. Specifically, after the determined EMD transactions are performed, and/or after one or more of the EMD coupons are determined ineligible for automated processing ("No" branch of block 212), then in block 218, the transfer report 56 may be updated to include a global result for all the passengers (e.g., "successful", "completed", "completed with errors"). In addition or alternatively, the transfer report 56 may be updated to indicate, for each passenger, which E-tickets were successfully or failed to be processed and/or which EMD coupons were successfully or failed to be processed. In the case of any failures, the transfer report 56 may also be updated to include the details of such failures for each passenger. For example, any EMD coupons determined ineligible for an automated transaction may be included in the transfer report 56 in a manner that is linked to the passenger associated with the EMD coupon, the flight associated with the EMD coupon, and/or the service associated with the EMD coupon within the transfer report 56.

Figure 6:
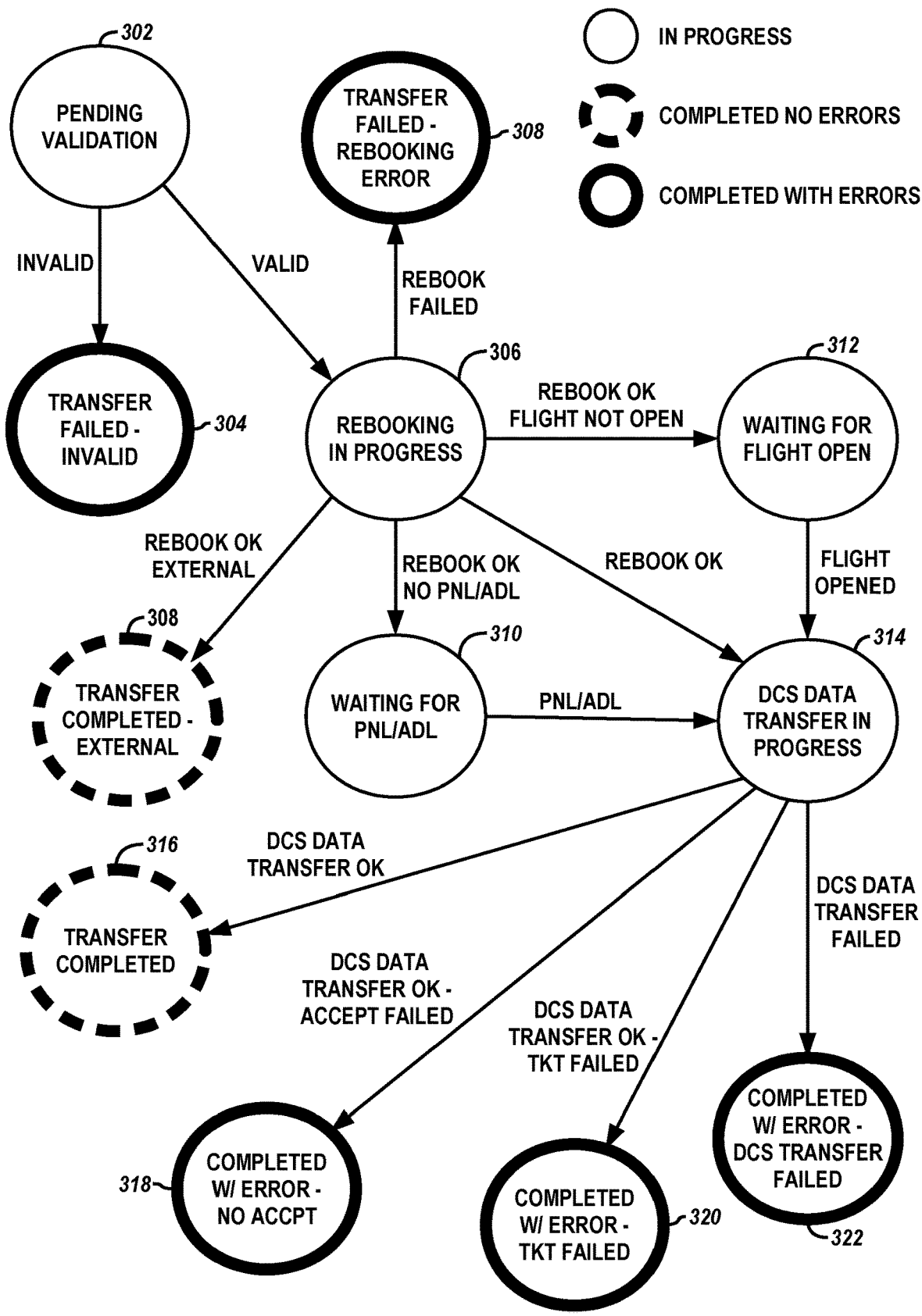
FIG. 6 is a diagram of an exemplary state machine that may be implemented by one or more of the computer systems of FIG. 1 and/or by the processing architecture of FIG. 3.

FIG. 6 illustrates a finite state machine 300 that may monitor the status of the process 100 for one or more passengers included in the process. As indicated in the figure, non-final states occurring during the transfer process 100 are represented by thin solid circles, final states occurring when the transfer process 100 has completed with no errors/warnings are represented by thick dashed circles, and final states occurring when the transfer process 100 has completed with errors/warnings are represented by thick solid circles. The state machine 300 may be utilized by the transfer module 52 to update the transfer report 56 at the various stages of the transfer process 100. Each state may represent a global state for the entire process 100, and/or a state of the process 100 for one or more of the requested passengers. In other words, each requested passenger may be in a different state of the state machine 300 at a given time, and each passenger may be associated with or represented by a different instance of the state machine 300 implemented by the operating environment 10 and/or the processing architecture 50.

When the transfer process 100 is triggered, the state machine 300 may enter a "pending validation" state 302. While in the pending validation state 302, the validation of block 104 of the process 100 may be in progress. Once the validation process has completed, the state machine 300 may receive an input representative of whether the transfer request 54 was found valid or invalid, such as from the transfer module 52. In response to receiving an input representing that the transfer request 54 was found invalid, the state machine 300 may transition to a "transfer failed—invalid" state 304. Alternatively, in response to the input representing that the transfer request 54 was found valid, the state machine 300 may transition to a "rebooking in progress" state 306.

While in the rebooking in progress state 306, one or more of blocks 108-118 of the process 100 may be in progress. Once completed, the state machine 300 may receive one of multiple inputs, each causing the state machine 300 to transition to a different state. For example, if the state machine 300 receives an input representative that rebooking failed for one or more passengers, then the state machine 300 of each of those passengers may transition to a "transfer failed—rebooking error" state 308. As previously described, the state machine 300 may separately represent each passenger or represent a global result of the process 100. Accordingly, when one or more passengers fail to be rebooked, the state machine 300 may transaction to the "transfer failed—rebooking error" state 308 for each passenger failed to be rebooked only, or for the entire process 100.

Alternatively, if the received input is representative that the rebooking was successful and the first new and/or first non-departed flight of the new travel itinerary is external to the DCS 18, then the state machine 300 may transition to a "transfer completed—external" state 308. Alternatively, if the received input represents that the rebooking was successful and a PNL or ADL has not yet been received for the flights implicated by the rebooking, then the state machine 300 may transition to a "waiting for PNL/ADL" state 310. Alternatively, if the received input represents that the rebooking was successful and one or more of the new flights in the new travel itinerary are not yet open in the DCS 18, then the state machine 300 may transition to a "waiting for flight open" state 312. Alternatively, if the received input represents that the rebooking was successful and a PNL or an ADL has been received for the new flights implicated by the rebooking, then the state machine 300 may transition to a "DCS Data transfer in progress" state 314, during which one or more of blocks 120-124 of the process 100 may be performed.

When in the "waiting for PNL/ADL" state 310 or the "waiting for flight open" state 312, the state machine 300 may receive an input representative of a PNL or ADL being received relevant to the rebooking, or of one or more flights relevant to the rebooking becoming open, respectively. In response to receiving either input, the state machine 300 may transition to the "DCS Data transfer in progress" state 314.

Again, once the state machine 300 is in the "DCS Data transfer in progress" state 314, the state machine 300 may receive one of multiple inputs that differently affect the next transition of the state machine 300. For example, the state machine 300 may receive an input representative that the DCS data transfer process was completed and/or manually ignored/bypassed by the agent, which may result in the state machine 300 transitioning to a "transfer completed" state 316. Alternatively, if the received input represents that the DCS data transfer process was completed for one or more passengers, but one or more of the passengers were not able to be accepted onto a new flight, then the state machine 300 may transition to a "completed with error—no accpt" state 318. Alternatively, if the received input represents that the DCS data transfer process was completed for one or more of the passengers, but errors occurred during the ticketing process, then the state machine 300 may transition to a "completed with error—tkt failed" state 320. Alternatively, if the received input represents that errors occurred during the DCS data transfer process, then the state machine 300 may transition to a "completed with error—DCS transfer failed" state 322. Based on the completed state shown in the transfer report 56, the agent may then fix any errors and retrigger any sub-process of the process 100, if necessary.

In general, the aforementioned offloading and ticketing processes may occur between exiting state 306 and exiting state 314. For example, after the rebooking is completed and the reservation record database 58 is updated, the reservation system 12 may automatically trigger one or more PNL's or ADL's to be sent to the DCS 18 that reflects the rebookings (e.g., reflects the removal of passengers from a replaced flight, or the addition of passengers to a new flight), at which point the transferred passengers may be offloaded from any replaced flights in which they have already been accepted. Also after the rebooking is completed, a call may also be made to the ticketing system 16 to perform the ticketing operations for the transferred passengers, as described above. The aforementioned acceptance process, which entails checking in the passengers onto new flights of the new travel itinerary, may occur during state 314.

One or more of the systems of operating environment 10, and/or the transfer module 52, may include executable code that generally follows the states of the state machine 300. In a particular embodiment, the systems and/or transfer module 52 may be specifically programmed so as to literally implement the finite state machine 300. In particular, the systems and/or transfer module 52 may store executable code that represents an array or data structure storing the possible states from the finite state machine 300. In addition, the code may include a pointer that is configured to point to a current state during the transfer process 100. Each state may be associated, within the code, with a lookup table that shows a next state given a certain input. Thus, during the transfer process 100, when the programmable code for the state machine 300 receives an input, the code may utilize the look-up table to determine the next state in which to transition. As previously described, the current state of the state machine 300 may be displayed in the transfer report 56 in relation to a global level and/or in relation to a particular passenger. Thus, by being programmed to literally implement the state machine 300, the systems and/or transfer module 52 may be able to report the current state of the of the transfer process 100 by simply querying the status of the state machine 300, which enables systems and/or transfer module 52 to realize resource savings and improved response times as compared to continuously querying the various systems to calculate which processes have occurred, and their results, at any given point during the process 100.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A disruption handling system that coordinates operation of a plurality of systems included in the disruption handling system after a disruption, the disruption handling system comprising:
    an inventory system comprising a first database that includes a plurality of counters, each of the counters tracking an availability figure for a travel product;
    a reservation system comprising a second database that includes one or more reservation records for a plurality of passengers, each of the passengers being included in one of the one or more reservation records and being associated within the one reservation record to a first travel itinerary on which the passenger is booked;
    a departure control system (DCS) comprising a third database that includes passenger data stored for each passenger that relates to the first travel itinerary of the passenger;
    a ticketing system comprising a fourth database that includes an E-ticket for each passenger, wherein the inventory system, the reservation system, the ticketing system, and the DCS are connected via a computer network;
    a plurality of processors, each of the inventory system, the reservation system, the ticketing system, and the DCS including at least one of the processors; and
    a plurality of memory devices including instructions that, upon execution by the processors, cause the disruption handling system to:
    in response to receiving, at the disruption handling system, a transfer request including the passengers and at least a portion of a second travel itinerary to replace the first travel itinerary of each passenger, the transfer request received after the first travel itinerary of each passenger has been disrupted:
        automatically update, by the inventory system, the counters of the first database based on the first travel itinerary of each passenger and the second travel itinerary;
        automatically update, by the reservation system, the one or more reservation records of the second database to reflect an association between each passenger and the second travel itinerary; and
    after the first and second databases have been updated:
        automatically perform, by the ticketing system, an automated ticketing process for each passenger for the second travel itinerary, and
        for each passenger, automatically transfer, by the DCS, the passenger data relating to the first travel itinerary to a record included in the third database that is associated with the second travel itinerary.

2. The disruption handling system of claim 1 wherein the instructions upon execution cause the disruption handling system to update, by the inventory system, the counters of the first database based on the first travel itinerary for each passenger and the second travel itinerary, and update, by the reservation system, the one or more reservation records of the second database to reflect an association between each passenger and the second travel itinerary by causing the disruption handling system to:
    determine, by the inventory system, whether the passengers can be rebooked onto the second travel itinerary based on the counters of the first database; and
    in response to determining that the passengers can be rebooked onto the second travel itinerary, perform the following for each passenger:

rebook, by the reservation system, the passenger onto the second travel itinerary in the second database, and update, by the inventory system, the counters of the first database based on the rebooking.

3. The disruption handling system of claim 1 wherein the instructions upon execution cause the disruption handling system to update, by the inventory system, the counters of the first database based on the first travel itinerary of each passenger and the second travel itinerary by causing the disruption handling system to:

transmit a single request to the inventory system, the single request including the first travel itinerary of each passenger and the second travel itinerary; and update, by the inventory system, the counters of the first database based on the single request.

4. The disruption handling system of claim 1 wherein the instructions upon execution further cause the disruption handling system to:

before the transfer request is received, generate, by the DCS, a backup record for each passenger that includes the passenger data relating to the first travel itinerary of the passenger, wherein the passenger data transferred for each passenger to the record associated with the second travel itinerary is from the backup record.

5. The disruption handling system of claim 4 wherein the first travel itinerary of each passenger comprises a common flight segment and a schedule change that relates to the common flight segment, and wherein the schedule change is executed within an operational window of the common flight segment.

6. The disruption handling system of claim 4 wherein the transfer request is generated via the DCS.

7. The disruption handling system of claim 1 wherein the passenger data for one of the passengers stored in the third database and relating to the first travel itinerary of the one passenger includes first baggage information for the one passenger, the first baggage information including a first baggage itinerary and a unique identifier, and the instructions upon execution cause the disruption handling system to transfer the passenger data stored for the one passenger relating to the first travel itinerary of the one passenger to the record included in the third database that is associated with the second travel itinerary by causing the disruption handling system to:

modify the first baggage information to include a second baggage itinerary that is based on the second travel itinerary; and add the modified baggage information to the record that is associated with the second travel itinerary, wherein the modified baggage information includes the unique identifier of the first baggage information.

8. The disruption handling system of claim 1 wherein the first travel itinerary of each passenger includes a replaced flight, the second travel itinerary includes a new flight that replaces the replaced flight of the first travel itinerary of each passenger, and the instructions upon execution further cause the disruption handling system to:

in response to the transfer request being received, and before the first and second databases are updated, lock the replaced flight of the first travel itinerary of each passenger and the new flight.

9. The disruption handling system of claim 1 wherein the instructions upon execution cause the disruption handling system to perform, by the ticketing system, the automated ticketing process for each passenger for the second travel itinerary by causing the disruption handling system to:

for each passenger, select an E-ticket transaction selected from the group consisting of an E-ticket revalidation transaction and an E-ticket exchange transaction; and transmit a single request to the ticketing system that includes the E-ticket transaction selected for each passenger.

10. The disruption handling system of claim 9 wherein the instructions upon execution cause the disruption handling system to perform, by the ticketing system, the automated ticketing process for each passenger for the second travel itinerary by further causing the disruption handling system to:

in response to receiving a rejection of the single request from the ticketing system, generate a separate ticketing request for each passenger; and transmit the separate ticketing request for each passenger to the ticketing system, wherein the ticketing system processes each separate ticketing request one at a time.

11. The disruption handling system of claim 9 wherein the instructions upon execution cause the disruption handling system to perform, by the ticketing system, the automated ticketing process for each passenger for the second travel itinerary by further causing the disruption handling system to:

perform, by the ticketing system, the E-ticket transaction selected for each passenger; and in response to the performance of the E-ticket transaction selected for each passenger by the ticketing system:

determine a plurality of electronic miscellaneous document (EMD) coupons associated with the passengers; and for each EMD coupon, select and perform an EMD transaction for the EMD coupon that is selected from the group consisting of an EMD dis-association transaction, an EMD association transaction, and an EMD exchange transaction.

12. A method for coordinating operation of a plurality of systems connected via a computer network that are included in a disruption handling system after a disruption, the systems including:

an inventory system comprising a first database that includes a plurality of counters, each of the counters tracking an availability figure for a travel product, a reservation system comprising a second database that includes one or more reservation records for a plurality of passengers, each of the passengers being included in one of the one or more reservation records and being associated within the one reservation record to a first travel itinerary on which the passenger is booked, a departure control system (DCS) comprising a third database that includes passenger data stored for each passenger that relates to the first travel itinerary of the passenger, and a ticketing system comprising a fourth database that includes the E-ticket for each passenger, the method comprising:

receiving, at the disruption handling system, a transfer request including the passengers and at least a portion of a second travel itinerary to replace the first travel itinerary of each passenger, the transfer request received after the first travel itinerary of each passenger has been disrupted; and in response to the transfer request being received at the disruption handling system:

automatically updating, by the inventory system, the counters of the first database based on the first travel itinerary of each passenger and the second travel itinerary;

automatically updating, by the reservation system, the one or more reservation records of the second database to reflect an association between each passenger and the second travel itinerary; and after the first and second databases have been updated:

automatically performing, by the ticketing system, an automated ticketing process for each passenger for the second travel itinerary, and for each passenger, automatically transferring, by the DCS, the passenger data relating to the first travel itinerary to a record included in the third database that is associated with the second travel itinerary.

13. The method of claim 12 wherein updating, by the inventory system, the counters of the first database based on the first travel itinerary for each passenger and the second travel itinerary, and updating, by the reservation system, the one or more reservation records of the second database to reflect an association between each passenger and the second travel itinerary comprises:

determining, by the inventory system, whether the passengers can be rebooked onto the second travel itinerary based on the counters of the first database; and in response to determining that the passengers can be rebooked onto the second travel itinerary, performing the following for each passenger:

rebooking, by the reservation system, the passenger onto the second travel itinerary in the second database, and updating, by the inventory system, the counters of the first database based on the rebooking.

14. The method of claim 12, wherein updating, by the inventory system, the counters of the first database based on the first travel itinerary of each passenger and the second travel itinerary comprises:

transmitting a single request to the inventory system, the single request including the first travel itinerary of each passenger and the second travel itinerary; and updating, by the inventory system, the counters of the first database based on the single request.

15. The method of claim 12 further comprising:

before the transfer request is received, generating, by the DCS, a backup record for each passenger that includes the passenger data relating to the first travel itinerary of the passenger, wherein the passenger data transferred for each passenger to the record associated with the second travel itinerary is from the backup record.

16. The method of claim 12 wherein the passenger data for one of the passengers included in the third database and relating to the first travel itinerary of the one passenger includes first baggage information for the one passenger, the first baggage information including a first baggage itinerary and a unique identifier, and transferring, by the DCS, the passenger data stored for the one passenger relating to the first travel itinerary of the one passenger to the record included in the third database that is associated with the second travel itinerary comprises:

modifying the first baggage information to include a second baggage itinerary that is based on the second travel itinerary; and adding the modified baggage information to the record that is associated with the second travel itinerary, wherein the modified baggage information includes the unique identifier of the first baggage information.

17. The method of claim 12 wherein the first travel itinerary of each passenger includes a replaced flight, the second travel itinerary includes a new flight that replaces the replaced flight of the first travel itinerary of each passenger, and further comprising:

in response to the transfer request being received, and before the first and second databases are updated, locking the replaced flight of the first travel itinerary of each passenger and the new flight.

18. The method of claim 12 wherein performing, by the ticketing system, the automated ticketing process for each passenger for the second travel itinerary comprises:

for each passenger, selecting an E-ticket transaction from the group consisting of an E-ticket revalidation transaction and an E-ticket exchange transaction; and transmitting a single request to the ticketing system that includes the E-ticket transaction selected for each passenger.

19. The method of claim 18 wherein performing, by the ticketing system, the automated ticketing process for each passenger for the second travel itinerary further comprises:

performing, by the ticketing system, the E-ticket transaction selected for each passenger; and in response to the performance of the E-ticket transaction selected for each passenger by the ticketing system:

determining a plurality of electronic miscellaneous document (EMD) coupons associated with the passengers; and for each EMD coupon, selecting and performing an EMD transaction for the EMD coupon that is selected from the group consisting of an EMD disassociation transaction, an EMD association transaction, and an EMD exchange transaction.

20. A computer program product for coordinating operation of a plurality of systems connected via a computer network that are included in a disruption handling system after a disruption, the systems comprising:

an inventory system comprising a first database that includes a plurality of counters, each of the counters tracking an availability figure for a travel product, a reservation system comprising a second database that includes one or more reservation records for a plurality of passengers, each of the passengers being included in one of the one or more reservation records and being associated within the one reservation record to a first travel itinerary on which the passenger is booked, a departure control system (DCS) comprising a third database that includes passenger data stored for each passenger that relates to the first travel itinerary of the passenger, and a ticketing system comprising a fourth database that includes the E-ticket for each passenger, the computer program product comprising:

a non-transitory computer readable storage medium; and instructions stored on the non-transitory computer readable storage medium that, upon execution by one or more processors of the disruption handling system, cause the disruption handling system to:

in response to receiving, at the disruption handling system, a transfer request including the passengers and at least a portion of a second travel itinerary to replace the first travel itinerary of each passenger, the transfer request received after the first travel itinerary of each passenger has been disrupted:

automatically update, by the inventory system, the counters of the first database based on the first travel itinerary of each passenger and the second travel itinerary;

automatically update, by the reservation system, the one or more reservation records of the second database to reflect an association between each passenger and the second travel itinerary; and after the first and second databases have been updated:

automatically perform, by the ticketing system, an automated ticketing process for each passenger for the second travel itinerary, and for each passenger, automatically transfer, by the DCS, the passenger data relating to the first travel itinerary to a record included in the third database that is associated with the second travel itinerary.

* * * * *